(12) United States Patent
Koh et al.

(10) Patent No.: US 7,584,465 B1
(45) Date of Patent: Sep. 1, 2009

(54) MEMORY MAPPING FOR SINGLE AND MULTI-PROCESSING IMPLEMENTATIONS OF CODE GENERATED FROM A BLOCK DIAGRAM MODEL

(75) Inventors: David Koh, Boston, MA (US); Zijad Galijasevic, Shrewsbury, MA (US)

(73) Assignee: The MathWorks, Inc., Natick, MA (US)

( * ) Notice: Subject to any disclaimer, the term of this patent is extended or adjusted under 35 U.S.C. 154(b) by 1021 days.

(21) Appl. No.: 11/019,044

(22) Filed: Dec. 20, 2004

Related U.S. Application Data

(60) Provisional application No. 60/611,618, filed on Sep. 20, 2004.

(51) Int. Cl.
*G06F 9/44* (2006.01)
*G06F 9/45* (2006.01)

(52) U.S. Cl. .................. 717/162; 717/113; 717/151; 717/159; 717/109

(58) Field of Classification Search .................. None
See application file for complete search history.

(56) References Cited

U.S. PATENT DOCUMENTS

| | | | |
|---|---|---|---|
| 6,826,748 B1 * | 11/2004 | Hohensee et al. | 717/130 |
| 6,983,456 B2 * | 1/2006 | Poznanovic et al. | 717/133 |
| 7,137,110 B1 * | 11/2006 | Reese et al. | 717/158 |

* cited by examiner

*Primary Examiner*—Chuck O Kendall
(74) *Attorney, Agent, or Firm*—Lahive & Cockfield, LLP; Kevin J. Canning

(57) ABSTRACT

Methods and systems are provided for automatically generating code from a graphical model representing a design to be implemented on components of a target computational hardware device. During the automatic code generating process, a memory mapping is automatically determined and generated to provide an optimization of execution of the program on the target device. The optimized memory mapping is incorporated into building the program executable from the automatically generated code of the graphical model.

57 Claims, 10 Drawing Sheets

MEMORY MAPPING FOR SINGLE AND MULTI-PROCESSING IMPLEMENTATIONS OF CODE GENERATED FROM A BLOCK DIAGRAM MODEL

RELATED APPLICATIONS

This present application claims priority to U.S. Provisional Patent Application No. 60/611,618, entitled "Memory Mapping For Single And Multi-Processing Implementations Of Code Generated From A Block Diagram Model", filed Sep. 20, 2004, which is incorporated herein by reference.

TECHNICAL FIELD

The present invention generally relates to technical computing, and, more particularly, to the memory mapping of a program automatically generated from a block diagram model.

BACKGROUND INFORMATION

Typically, computational hardware devices, such as general purpose processors, microcontrollers, and DSPs, will include one or more types of memory with varying memory access rates. For example, an embedded system may have digital signal processors (DSPs), where each processor may contain on-chip RAM and/or ROM memory. Furthermore, each DSP may also access external memory and the multiple DSPs may share the same external memory. On-chip memory is typically faster but smaller in size than the external memory. The size of the code and data segments of a program may be larger than the available on-chip memory of the processor that will run the program. For example, an embedded real-time program designed for the DSP may be too large to fit in the on-chip memory. As such, sections of the code and data segments of the program must be stored to external memory, and the processing unit of the DSP will read and write code and data segments from the external memory as needed. As part of deploying a program to a target processor, the code and data segments are mapped to the internal and external memory available to the processor. Since there are various types of memory with different access rates, the resulting memory mapping scheme deployed for the program can significantly impact the execution performance of the program.

To determine how to map the data and code segments of the program to the available memory resources, a detailed understanding of the algorithm implemented by the program as well as the underlying architecture of the processor is required. As such, determining a memory mapping for a program implementing a certain algorithm for a particular type of processor with various memory access rates is a challenging and difficult task. Furthermore, this can be even more daunting for systems with multiple different processors sharing memory resources. Typically, a memory mapping for a particular program to run on a certain processor and memory profile is performed manually through trial and error. This approach delivers little assurance of providing an intelligent memory mapping in a systematic way that will improve or optimize execution of the program on the processor.

In graphical modeling environments, such as a model-based design tool, block diagram models can be created to represent the design, or algorithm, of an implementation for a computational hardware device. One or more block diagram models may represent a design targeted for a single or multiple processor devices with one or more memory elements. An automatic code generation application can automatically generate code and build programs from the block diagram model to implement code for the device based on the design. In this manner, the design of a block diagram model behaves as an implementation specification for automatic code generation. However, during the code generation process, a static, default memory mapping may be specified for compiling and linking the generated code. This default memory mapping is not optimized for the execution of the program on the target device. As such, the automatic code generation application does not incorporate optimization of the memory mapping into the code generation process. The automatically generated memory mapping is optimized as a function of the given block diagram model for the specified embedded hardware platform.

SUMMARY OF THE INVENTION

It is desired to provide an intelligent and systematic approach to determining and generating a memory mapping of code and data segments of a program that improves performance of the program generated from a graphical model, such as a block diagram model. The present invention provides systems and methods for automatically generating code for a software implementation of a graphical model and to automatically generate an optimized memory mapping to build a program from the generated code. The automatically generated memory mapping is optimized as a function of the given graphical model for a specific computational hardware device. A graphical model may represent a design to implement software in a computational hardware device with one or more processors and one or more memory elements, either on the processors and/or external to the processors. The automatic code generation translates the graphical model into source code comprising the functionality represented by the graphical model. During generation of the source code and the building of object code, the code and data segments of the program are placed in uniquely named memory sections to provide an implementation structure to incorporate a modified memory mapping into the build process of the program.

From a profile of the code and data segments of the program and a profile of the memory elements of the target device, a memory mapping is automatically generated to provide an optimization of execution of the program on the target device. The memory mapping includes a description of the placement of the uniquely named memory sections to portions of the one or more memory elements of the target device. Optimization of memory mappings can employ various optimization techniques to provide improved execution of the program on the target hardware in comparison to any provided default memory mapping, such as a memory mapping provided by a manual trial-and-error process. The optimized memory mapping is provided to the automatic code generation process to incorporate into the building of the program executable. As such, the program when loaded and executed on the target device will execute according to the memory mapping optimizations.

Additionally, the systems and methods of automatically generating a memory mapping and source code from a graphical model can take into consideration multiple processor devices with multiple memory elements and memory elements shared between processors. The automatic code generation and optimization techniques of the present invention for memory mapping may take into consideration any data transfers between different processors, the broadcasting of data to multiple processors, any synchronization of processing across processors and any other impact the hardware topology and graphical model design may have on the optimization of the memory mapping for programs running on each of the processors. In summary, the present invention automatically determines an optimization of a memory mapping for one or more programs that are being automatically generated from one or more graphical models. The programs are built into executables incorporating the optimized memory mappings in order to execute according to the optimizations.

In one aspect, the present invention relates to a method for determining a memory mapping of a program to execute on a computational hardware device having one or more processors. The program may be generated from a graphical model, such as a block diagram model. The method includes the step of receiving program information comprising a description of one or more program segments. Each program segment includes a code and/or a data segment of the program. The method also receives memory information comprising a description of one or more memory elements of the computational hardware device. The method then compares the program information to the memory information to determine a memory mapping that provides for executing the program in a desired manner, e.g., an optimization, on the computational hardware device. The memory mapping includes a description of placement of the program segments to portions of the memory elements. The method further provides that the memory mapping is determined automatically by a memory mapping generator and provided to build an executable of the program incorporating the memory mapping.

In one aspect of the present invention, the program information includes a description of one or more of the following: 1) a size of one of the code segments and the data segments, 2) a frequency of access by the program to one of the code segments and the data segments, and 3) a priority assigned to one of the code segments and the data segments. In another aspect, the memory information includes a description of one or more of the following: 1) a size of the memory element, 2) an access rate of the memory element, and 3) a configuration of the memory element. In a further aspect, the memory mapping is determined by applying a heuristic, an exhaustive, or a genetic type of optimization algorithm.

In another aspect of the present invention, the method determines the memory mapping by determining from the program information a first program segment having a first priority, and determining from the memory information a first memory portion of the one or more memory elements having a first desired characteristic. Then the method assigns the first program segment to the first memory portion. The method also determines from the program information a second program segment having a second priority, and determines from the memory information a second memory portion of the one or more memory elements. The second memory portion may include a portion of a memory element having the first desired characteristic if the second program segment fits into the second memory portion. Otherwise, the second memory portion may include a portion of a memory element have a second desired characteristic. The second program segment is then assigned to the second memory portion. The priority of program segments for assigning is determined from the size of any of the code and data segments of the program segment. The priority can also be determined from the frequency of access by the program to the program segment.

In an additional aspect of the present invention, the method determines the memory mapping by determining a first memory mapping from a plurality of memory mappings for executing the program on the computational hardware. The method determines a first time profile from executing on a program simulator the program incorporating the first memory mapping. Then the method determines if the first time profile associated with the first memory mapping provides a desired time profile. In a further aspect, the method obtains a second memory mapping from the plurality of memory mappings for executing the program on the computational hardware device, and determines a second time profile from executing on the program simulator the program incorporating the second memory mapping. The method then compares the first time profile to the second time profile to determine the memory mapping that provides the desired time profile.

In another aspect, the present invention relates to a device readable medium having device readable instructions to execute the steps of the method, as described above, related to determining a memory mapping of a program to execute on a computational hardware device. In a further aspect, the present invention also relates to computer data signals transmitted over a transmission medium that represent device readable instructions to execute the steps of the method, as described above, related to determining a memory mapping of a program to execute on a computational hardware device.

In another aspect, the present invention relates to a method for generating code to incorporate a memory mapping into an executable of a program to run on a computational hardware device. The method includes the step of initiating an automatic generation of code for a graphical model to provide a program to run on a computational hardware device having one or more processors. The method also includes the step of assigning one of a code segment and a data segment of the generated code to a named memory section to be associated with a memory element of the computational hardware device. The code and data segment represents at least a portion of functionality of the graphical model, such as a block of a block diagram model. The method obtains a memory mapping providing an optimization of execution of the program on the computational hardware device. The memory mapping describes a placement of one of the code segment and the data segment to a portion of a memory element of the computational hardware device. The method then provides a linker command file to associate in building an executable of the program the named memory section with the portion of the memory element as determined by the memory mapping. In one aspect, the method further includes building an executable of the program from the code with the linker file to incorporate the memory mapping. In another aspect, the method, during the automatic generation of code, assigns one of the code segment and the data segment to the named memory section by a compiler or linker directive.

In another aspect, the present invention relates to a device readable medium having device readable instructions to execute the steps of the method, as described above, related to generating code to incorporate a memory mapping into an executable of a program to run on a computational hardware device. In a further aspect, the present invention also relates to computer data signals transmitted over a transmission medium that represent device readable instructions to execute the steps of the method, as described above, related to generating code to incorporate a memory mapping into an executable of a program to run on a computational hardware device.

In one aspect, the present invention relates to a method for automatically generating code from a graphical model and determining a memory mapping to implement a program in a computational hardware device having one or more processors. The method initiates an automatic generation of code from a graphical model to generate a program to execute on the computational hardware device. The automatic generation of code provides compiler directives to place code and data segments into a named memory section. The code and data segments represent at least a portion of functionality of the graphical model. The method obtains program information that includes a description of the code and data segments of the program, and also obtains memory information that includes a description of the memory elements of the computational hardware device. The method then generates a memory mapping to provide an optimization of execution of the program on the computational hardware device, or to otherwise have the program executed in a desired manner. The memory mapping is automatically generated from a comparison between the program information and the memory information to determine a placement of one or more code and data segments of the program to portions of the one or more memory elements of the computational hardware device. The method also generates a linker command file to associate the named memory section with the portion of the memory element as determined by the memory mapping.

In an additional aspect of the present invention, automatically generating the memory mapping includes the steps of determining from the program information a first program segment having a first priority, and determining from the memory information a first memory portion of the one or more memory elements having a first desired characteristic, and assigning the first program segment to the first memory portion. The method then determines from the program information a second program segment having a second priority, and determines from the memory information a second memory portion of the one or more memory elements having either the first desired characteristic or a second desired characteristics, and assigns the second program segment to the second memory portion. The method provides as the memory mapping for the automatic code generation a memory mapping identifying the assignment of the first program segment and the second program segment. In a further aspect, the priorities of the first and second program segments are determined from a size of the program segment and an access frequency by the program to the program segment.

In a further aspect of the present invention, automatically generating the memory mapping includes the steps of determining a first memory mapping and a second memory mapping from a plurality of memory mappings for executing the program on the computational hardware. The method then simulates on a program simulator execution of the program incorporating the first memory mapping to determine a first time profile, and simulates on the program simulator execution of the program incorporating the second memory mapping to determine a second time profile. The method provides as the memory mapping one of the first memory mapping and the second memory mapping having a desired time profile.

In a further aspect, the present invention relates to a device readable medium including device readable instructions to execute the steps of the method, as described above, related to automatically generating code and determining a memory mapping for the execution of a program on a computational hardware device. In a further aspect, the present invention relates to computer data signals transmitted over a transmission medium that represent device readable instructions to execute the steps of the method, as described above, related to automatically generating code and determining a memory mapping for the execution of a program on a computational hardware device.

In one aspect, the present invention is related to a system to generate a program from a graphical model, such as a block diagram model, and to determine a memory mapping for the execution of the program on a computational hardware device. The system includes an automatic code generator and a memory mapping generator. The automatic code generator generates code from a graphical model to build a program to execute on a computational hardware device having one or more processors. The automatic code generator also provides a compiler directive to associate one of a code segment and a data segment with a named memory section to be associated with a memory element of the computational hardware device. The code and data segment represent at least a portion of functionality of the graphical model. The memory mapping generator obtains program information descriptive of the code and data segment, and obtains memory information descriptive of the one or more memory elements of the computational hardware device to automatically generate a memory mapping that provides an optimization of execution of the program on the computational hardware device. The memory mapping generator automatically generates the memory mapping from a comparison between the program information and the memory information to determine a placement of one or more code and data segments of the program to portions of the one or more memory elements of the computational hardware device.

In one aspect, the automatic code generator and the memory mapping generator may execute on one of a client and a server. Furthermore, the program information, the memory information, the code, and the memory mapping may reside on one of the client and the server. In a further aspect, the automatic code generator generates a linker file to incorporate the memory mapping provided by the memory mapping generator into the building of the program. The automatic code generator in communication with the memory mapping generator may automatically obtain the memory mapping from the memory mapping generator.

In an additional aspect, the memory mapping generator automatically generates the memory mapping by determining from the program information a first program segment having a first priority, and determining from the memory information a first memory portion of the one or more memory elements having a first desired characteristic, and assigning the first program segment to the first memory portion. The memory mapping generator then determines from the program information a second program segment having a second priority, and determines from the memory information a second memory portion of the one or more memory elements having either the first or a second desired characteristic, and assigns the second program segment to the second memory portion. The system then provides as the memory mapping a memory mapping that includes the memory assignments of the first program segment and the second program segment.

In yet another aspect, the memory mapping generator automatically generates the memory mapping by determining a first memory mapping and a second memory mapping from a plurality of memory mappings for executing the program on the computational hardware. The memory mapping generator simulates on a program simulator execution of the program incorporating the first memory mapping to determine a first time profile, and simulates on the program simulator execution of the program incorporating the second memory mapping to determine a second time profile. The memory mapping generator then provides as the memory mapping one of the first memory mapping and the second memory mapping having a desired time profile.

The details of various embodiments of the invention are set forth in the accompanying drawings and the description below.

BRIEF DESCRIPTION OF THE DRAWINGS

The foregoing and other objects, aspects, features, and advantages of the invention will become more apparent and may be better understood by referring to the following description taken in conjunction with the accompanying drawings, in which.

DETAILED DESCRIPTION

Certain embodiments of the present invention are described below. It is, however, expressly noted that the present invention is not limited to these embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combinations or permutations are not expressly made herein, without departing from the spirit and scope of the invention.

The illustrative embodiment of the present invention provides systems and methods for automatically and systematically generating a memory mapping for a program to be implemented in a computational hardware device with one or more processors and one or more memory elements. The memory mapping determines the placement of code and data segments of a program to selected sections of memory of the memory elements. Optimization techniques are applied during the memory mapping generation process to determine a memory mapping that optimizes execution of the program on the one or more processors. The resulting memory mapping is applied to an automatic code generating process to form an executable for the program that incorporates the memory mapping.

Furthermore, the illustrative embodiment provides for automatically generating code from a block diagram model in a manner by which a generated memory mapping can be implemented into the process of building a program executable. The automatic code generation process generates code for each block of a block diagram model to place each code and data segment of the code into a uniquely named memory section. From a provided memory mapping, such as an optimized memory mapping, the automatic code generation process creates a linker-command file to use during the compiling and linking of a program to form an executable. The linker-command file defines the memory mapping to direct the code and data segments of the uniquely named memory section for each block to be placed in the portions of memory as determined by the memory mapping.

Additionally, the illustrative embodiment of the present invention also provides for a user to flexibly configure memory mappings via a configuration mechanism such as a graphical user interface. A user can create and configure memory mappings to have code and data segments of the program generated from the block diagram model mapped to portions of memory elements also configurable by the user. Furthermore, the configurability of the present invention allows a user to select, edit and modify memory mappings generated automatically by the memory mapping generator to configure the program to run in a desired manner.

Figure 1:
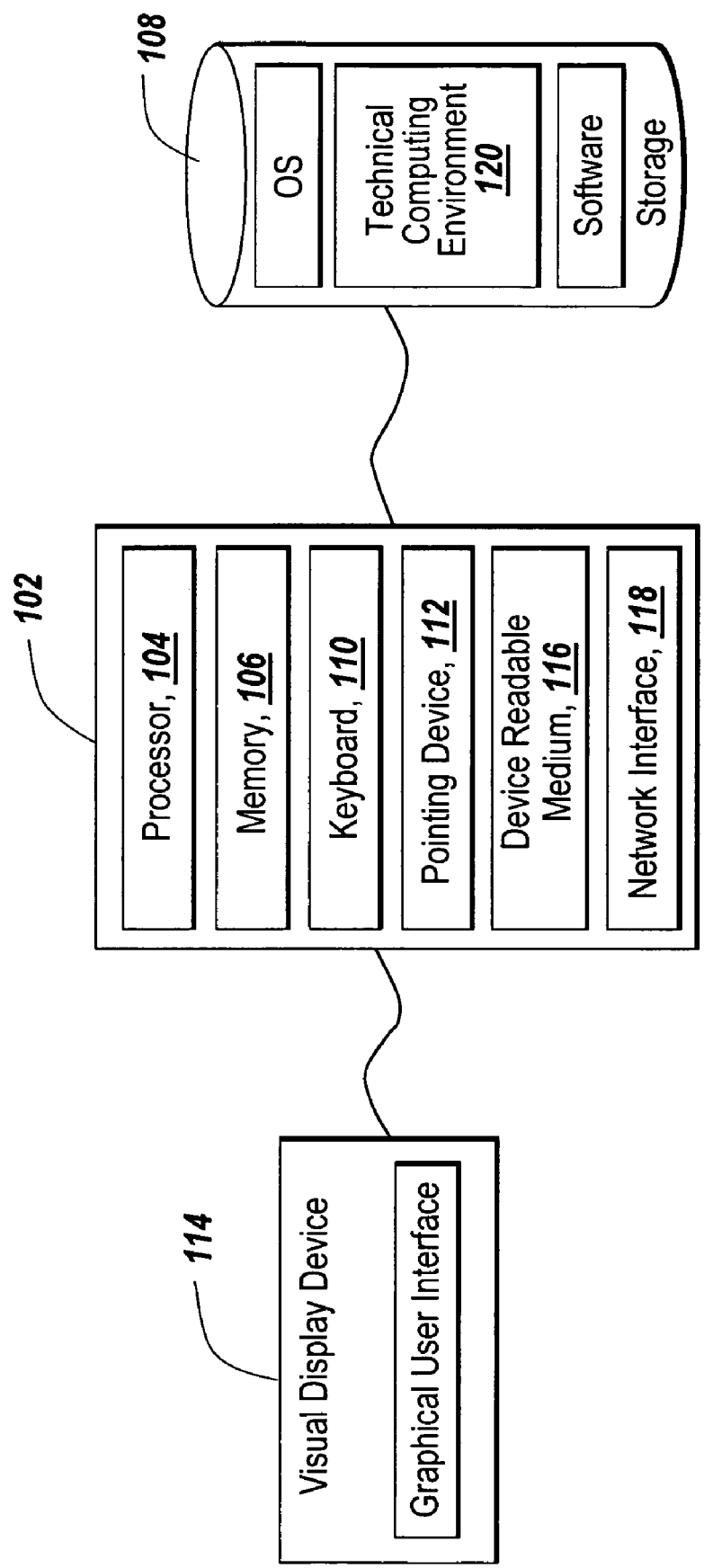
FIG. 1 is a block diagram of a computing device for practicing an embodiment of the present invention.

FIG. 1 depicts an environment suitable for practicing an illustrative embodiment of the present invention. The environment includes a computing device 102 having memory 106, on which software according to one embodiment of the present invention may be stored, a processor (CPU) 104 for executing software stored in the memory 106, and other programs for controlling system hardware. The memory 106 may comprise a computer system memory or random access memory such as DRAM, SRAM, EDO RAM, etc. The memory 106 may comprise other types of memory as well, or combinations thereof. A human user may interact with the computing device 102 through a visual display device 114 such as a computer monitor, which may display a graphical user interface (GUI). The computing device 102 may include other I/O devices such a keyboard 110 and a pointing device 112, for example a mouse, for receiving input from a user. Optionally, the keyboard 110 and the pointing device 112 may be connected to the visual display device 114. The computing device 102 may include other suitable conventional I/O peripherals. For installing software programs, the computing device 102 may support any device readable medium 116, such as a CD-ROM, DVD-ROM, floppy disks, tape device, USB device, hard-drive or any other suitable device. The computing device 102 may further comprise a storage device 108, such as a hard-drive or CD-ROM, for storing an operating system and other related software, and for storing application software programs. The present invention of a technical computing environment 120 may comprise software that is installed via a device readable medium 116 and stored in the storage device 108. Additionally, the operating system and the technical computing environment 120 can be run from a bootable CD, such as, for example, KNOPPIX®, a bootable CD for GNU/Linux.

Additionally, the computing device 102 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g. ISDN, Frame Relay, ATM), cluster interconnections (Myrinet), peripheral component interconnections (PCI, PCI-X), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 118 to any type of network capable of communication and performing the operations described herein. Moreover, the computing device 102 may be any computer system such as a workstation, desktop computer, server, laptop, handheld computer or other form of computing or telecommunications device that is capable of communication and that has sufficient processor power and memory capacity to perform the operations described herein.

The computing device 102 may run any type of operating system such as Microsoft® Windows, a version of UNIX, a version of Linux, a real time operating system or any other type of operating system capable of operating on the computing device 102. The technical computing environment 120 may be capable of and configured to operate on any of the operating systems that may be running on and controlling the computing device 102. Furthermore, the technical computing environment 120 may be capable of and configured to operate on and take advantage of different processors 104 of a computing device 102. For example, the technical computing environment 120 may run on a 32 bit processor of one computing device 102 and a 64 bit processor of another computing device 102'. One ordinarily skilled in the art will recognize the various combinations of operating systems and processors that may be running on any of the computing devices 102. In summary, the technical computing environment 120 and other components of the present invention may be deployed across a wide range of different computing devices, different operating systems and different processors.

In a brief introduction, the technical computing environment 120 of the present invention provides a graphical modeling environment, such as the graphical modeling environment of Simulink® from the MathWorks, Inc. of Natick, Mass., for creating, designing, simulating, testing and verifying block diagram models and for automatically generating code from block diagram models. In the graphical modeling environment, customizable functional blocks are used to create block diagram models that may represent a design, or algorithm, for a control system, a signal processing system, a communication system, any other time-varying or dynamic system or any computational hardware device. For example, the block diagram model may represent a design to be implemented on a multiple processor embedded control system with one or more memory elements such as shared memory. The technical computing environment also 120 comprises an automatic code generation application, such as the automatic code generator of Real-Time Workshop® from the MathWorks, Inc. of Natick, Mass., to generate source code from a block diagram model to translate the functionality of the blocks of the block diagram model into a program that may be designed to run on any microprocessor, real-time operating system, or otherwise customized to run on a specific target hardware platform. For example, a block diagram model representing a system design for a multiple processor embedded control system can be translated into source code to build a program executable to run on the specific type of processor of the target device.

The target device may comprise any type of computational hardware device that may be modeled by the graphical modeling environment, such as the graphical modeling environment provided by Simulink®. A computational hardware device may comprise one or more components integrated together to perform the intended purpose of the hardware design, and may also comprise other computational hardware devices, which in turn may comprise one or more components. A component of a computational hardware device may comprise any type of integrated circuit or chip, such as a processor, field programmable gate array (FPGA), programmable logic device (PLD), or application-specific integrated circuit (ASIC). A processor may be a digital signal processor (DSP), general purpose processor (GPP) or a microcontroller. Furthermore, the component may be a digital, analog or mixed-signal component. Moreover, the computational hardware device may comprise any combination of like and/or different processors, FPGAs and ASICs to form a heterogeneous environment of components. For example, the computational hardware device may comprise multiple processors with one processor being a GPP and the other a DSP. Additionally, the computational hardware device may include a physical communication interface between components such as a programmable I/O, Direct Memory Access (DMA), FIFO queued buffer, etc. One ordinarily skilled in the art will appreciate the various types of components that can be designed and integrated into a computational hardware device.

Figure 2A:
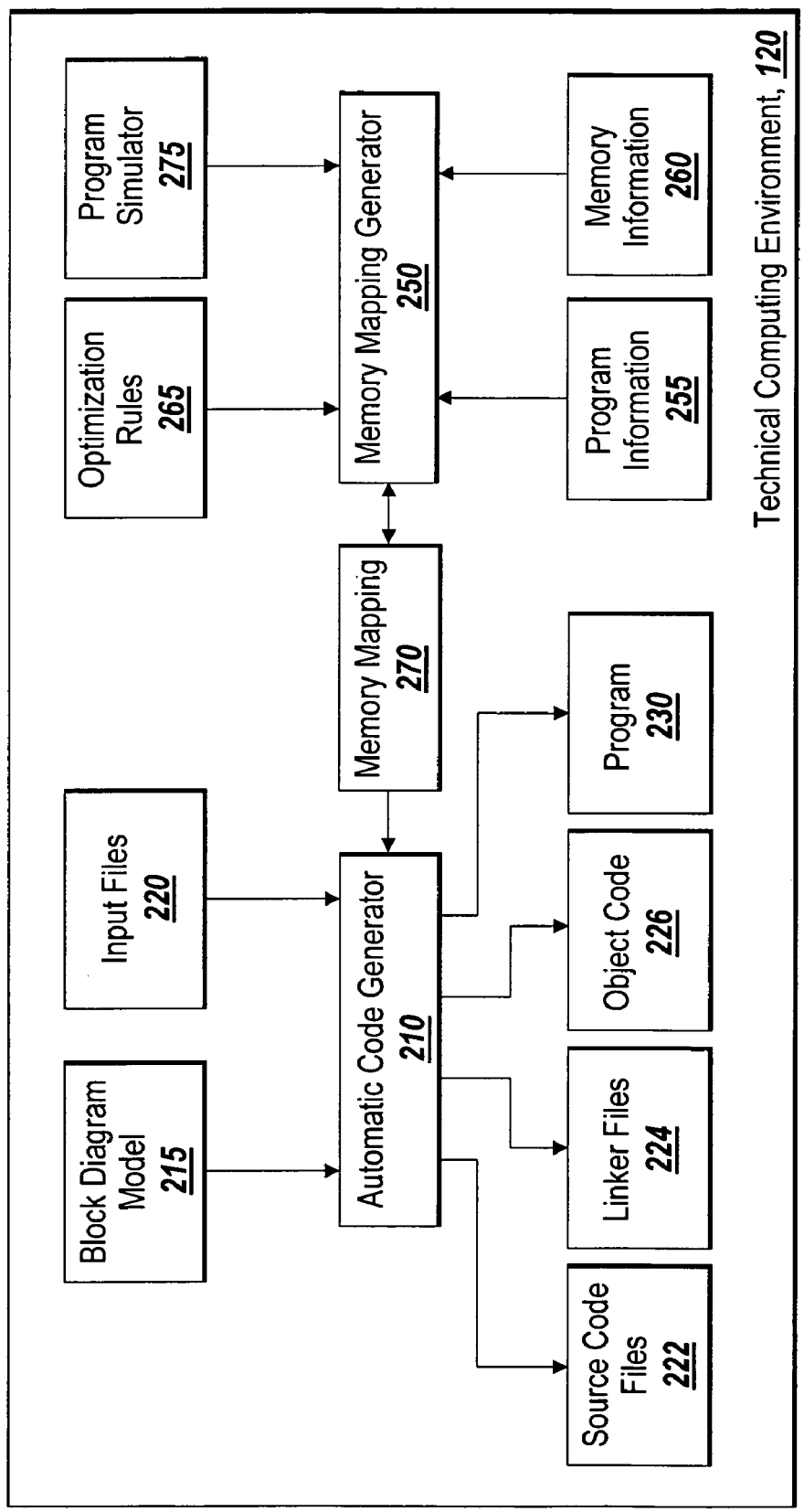
FIG. 2A is a block diagram of the components of an embodiment of the present invention in a computing device.

In one aspect, the present invention relates to automatically generating an optimized memory mapping for code generated for a specific hardware target by applying program specific and target specific information to the memory mapping optimization. FIG. 2A depicts an illustration of the components of an embodiment for practicing this aspect of the present invention. In brief overview, a system 200 comprises a technical computing environment 120 including an automatic code generator 210, such as Real-Time Workshop®, and a memory mapping generator 250. The automatic code generator 210 obtains a block diagram model 215 and any input files 220 to translate the blocks of the block diagram model 215 and generate source code representing the functionality configured in the blocks of the block diagram model 215. The automatic code generator 210 compiles the source code 222 into object code 226 and via the linker files can build a program executable 230. The memory mapping generator 250 obtains program information 255 describing attributes of the code and data segments of the program 230. The memory mapping generator also obtains memory information 260 describing attributes of the memory structure of a target specific hardware to which the model block diagram model 215 was designed to be implemented on. The memory mapping generator 250 can be configured with one or more optimization rules 265 for comparing the program information 255 to the memory information 260 to generate a memory mapping 270 according to the configured logic of the optimization rules 265. Additionally, the memory mapping generator 250 may interface with a program simulator 275 to simulate a performance of the program 230 or instructions of the program 230 based on a generated memory mapping 270.

As input to the automatic code generator 210, the block diagram model 215 may represent a design, or algorithm, to be implemented on a single or multiple processor computational hardware device with one or more memory elements internal and/or external to the processors. The block diagram model 215 may comprise multiple block diagram models, each representing one or more components of a computational hardware device, such as one or more processors. In another embodiment, the block diagram model 215 may comprise a partitioned block diagram model 215 with each partition representing a component of a multi-component computational hardware device. The block diagram model 215 may comprise one or more files accessible by the technical computing environment 120 and in a format readable and understandable by the automatic code generator 220. In other embodiments, the block diagram model 215 may be obtained from a block diagram modeling environment, or another technical computing environment. In other embodiments, the automatic code generator 210 may obtain the block diagram model 215 from an application programming interface (API) call to another application, or via an interface to another system.

The one or more input files 220 to the automatic code generator 210 may include templates, commands, input parameters, configuration data, source code, data and class definitions, or any other information that may be used by the automatic code generator 220 to generate source code for the block diagram model 215. The input files 220 may include files to provide input to and configure the automatic code generator 210 to generate source code files 222 for a specific target hardware platform, for example, a specific processor. In an exemplary embodiment of Real-Time Workshop® as the automatic code generator 210, Real-Time Workshop® uses target language compiler script files, with a .tlc file extension, as input files 222 to the code generation process. The .tlc files provide sections of programming instructions to be implemented for block references as they may be found in a block diagram model 215 during the code generation process. The .tlc files also can provide data and class definitions for data element references found in the block diagram model 215. Additionally, the .tlc files also comprise compiler directives, built-in functions and other code generation commands to direct Real-Time Workshop® during the code generation process.

In operation, the automatic code generator 210 reads in the block diagram model 215 and the input files 220 to generate source code by translating the block diagram model 215 into one or more source code files 222. By way of example, the automatic code generation can be discussed in terms of generating code with Real-Time Workshop® from a block model diagram 215 generated with Simulink®. Simulink® creates and stores block diagram models into model files with a .mdl file extension. As part of the code generation process, Real-Time Workshop® reads in a .mdl model file and analyzes the model to generate an intermediate model file with an .rtw extension. This intermediate .rtw model file comprises a hierarchical structure of records describing systems and their blocks and connections analyzed from a block diagram model 215 of the .mdl file.

A language compiler called the target language compiler of Real-Time Workshop® works with .tlc files and .rtw files to produce code. The target language compiler interprets a program that reads the intermediate model file description of a .rtw file. As the target language compiler encounter a record in the .rtw file, it uses directives in the .tlc files corresponding to the record to direct the code generation process for the specific record. As such, the target language compiler works much like a text processor. For example, the target language compiler uses block .tlc files, which specify the particular code for a block, to transform each block into code. When it reads a record in the .rtw file that references a block, the target language compiler applies code from the corresponding block .tlc file to generate code for the block in source code files 222. Additionally, model wide .tlc files are also used to provide input to the target language compiler for global customization of the code. Model wide .tlc files may direct the target language compiler to generate main routines to provide entry points into the program, source code header files to setup data structures, and utility functions to support code for particular blocks. The block and model wide .tlc files can be modified to generate customized code for blocks and to generate any desired global customizations to the code.

The source code files 222 generated from the automatic code generator 210, such as Real-Time Workshop®, may comprise program instructions of a programming language, such as C, which may further be in a format and style following the ANSI/ISO C standard. Additionally, the source code files 222 may be generated to comprise fixed-point or floating-point source code. The program instructions of the source code files 222 may be generated to run on any operating system, such as a real-time operation system, or for a specific processor. Furthermore, the programming instructions of the source code files 222 may be optimized for performance or versatility, and/or for a specific target hardware platform. Furthermore, the automatic code generator 210 can be configured via the input files 220 to generate custom source code comprising a style and format as directed by the input files 220. The automatic code generator 210 can be also configured via the input files 220 to provide customized source code to support such customizations as error handling, optimization, code and data reduction, code reusability, scoping of variables, and other characteristics of the source code that may be modified during the source code generation process.

During the generation of source code, the automatic code generator 210 will generate source code for each block of the block diagram model 215 and place the code and data segments of the block's source code into a uniquely named memory section. In an exemplary embodiment, the automatic code generator 210 associates the code and data segments of a block's source code to a named memory section by using a compiler and/or linker preprocessing directive of the programming language. For example, a #pragma statement in the C programming language is used to specify compiler directives, and can be used to define precise control over the memory area where data is placed. A #pragma <section-name> statement in C creates a defined named section within the object file created by compilation. The <section-name> provided should not conflict with any standard section names already used by the compiler. The compiler may generate code and data sections mapped to default memory sections, such as the .bss memory section, which is the default segment in the object code 226 for uninitialized data in a C/C++ implementation. Another default memory section is the .data segment for holding initialized variables. With the #pragma <section name> statement, a uniquely named memory section can be defined using a name other than a standard section name to create a memory section with the name of <section name> in the compiled object code 226. For example, a section of code and data from a block from the block diagram model 215 may be placed into a named memory section of .sec1. A pragma directive of "#pragma .sec1" creates a named memory section of .sec1 to be used during compilation. Through pragma directives code and data segments generated from a block from a block diagram model 215 can be placed into, or otherwise associated, with the named memory section of .sec1. In this manner, the object code 226 comprises code and data segments associated with a named memory section to be mapped along with the standard named memory sections according to the memory mapping techniques of the present invention. One ordinarily skilled in the art will appreciate the use of compiler and/or linker directives, such as the #pragma in C, to provide for named memory sections, and that such directives will depend on and may be different for various programming languages and architectures.

Although it is generally discussed above that the automatic code generator 210 places code and data segments generated for a block of the block diagram model 215 into a named memory section, the automatic code generator 210 may place code and data segments representing multiple blocks into the same named memory section. Furthermore, the block diagram model 215 may place code and data segments representing one or more signals of the block diagram model 215 into a named memory section. Signals in block diagram models 215, such as block diagram models 215 provided by Simulink®, are known by one ordinarily skilled in the art, and provide a time varying quantity that may be configured with a wide range of attributes. Moreover, the automatic code generator 210 may place code and data segments representing any portion of the block diagram model 215 of any granularity into a named memory section.

The automatic code generator 210 also provides for the building of the generated source code files 222 into object code 226 and a program executable 230. The automatic code generator 210 may generate a linker command file 224 using an initial or default memory mapping 270, or the automatic code generator 210 may allow a linking utility to generate the program executable 230 with a default memory mapping provided by the linking utility. This default memory mapping will not be optimized for the program 230 to run on a target device. The build process may include compiling the source code 222 and linking libraries, drivers and other programs via a make program or some other compiling utility to create object code files 226. The program executable 230 is built via a linker utility applying the linking command files 224 in processing the object code files 226. With the code and data segments of the source code 222 for each block placed into a uniquely named memory section, the object code 226 can be re-linked or linked with different linker files to generate a program executable 230 using a different memory mapping 270, 270'. In one embodiment, the automatic code generator 210 can obtain a memory mapping 270 from the memory mapping generator 250 to produce linker command files 224 implementing the optimized memory mapping 270. For example, the automatic code generator 250 may automatically request a memory mapping 270 from the memory mapping generator 250 during the course of automatically generating source code and building an executable. The automatic code generator 210 then can build the object code 226, including the named memory sections, into a program 230 using the linker command files 224 representing the optimized memory mapping 270. In another embodiment, the memory mapping generator 250 may automatically generate linker command files 224 from a generated memory mapping 270.

Although generally discussed in terms of building a program 230, the automatic code generator 210 may build multiple programs 230 from one or more block diagram models 215 in one or multiple executions of the automatic code generator 230. As such, the automatic code generator 230 may produce multiple sets of source code files 222, multiple sets of object code 226, multiple linker command files 244 to produce multiple programs 230. Furthermore, each program 230 and associated source code 222, linker 224 and object files 226 may represent algorithms of the block diagram model 215 targeted to be implemented on separate processors of a computational hardware device and additionally may include communication interfaces between the processors such as a communication interface to shared memory used by the processors. Additionally, each communication interface of the programs 230 may be designed to transfer data between processors, broadcast data to multiple processors or otherwise synchronize processing across processors.

Still referring to FIG. 2A, the memory mapping generator 250 generates one or more optimizations of a memory mapping 270 for the program 230 to run on a processor on a computational hardware device with one or more memory elements in the processor, or otherwise external to the processor. The generated memory mapping may be used by the automatic code generator 250. The memory mapping generator 250 obtains program specific information 255 and memory specific information 260 to apply one or more optimization rules 265 to generate the memory mapping 270.

The program information 255 comprises a description of attributes of the code and data segments of the program. Each code and data segment in the program information 255 may represent a block of the block diagram model 215 and may be uniquely identified by a name. The program information 255 may include the size in kilobytes or other related unit of measurement of each of the code and data segments. It may also include the frequency of access by the program 230 to the data segments and the frequency of execution by the program 230 of the code segments. The program information 255 may also include a computational burden of each section of code of the program 230. Additionally, the program information 255 may assign a priority or some other weighted factor to each of the code and data segments in the program information 255.

The program information 255 may be automatically generated from the automatic code generator 250 or extracted from any of the source code files 222, linker files 224 or object code 226 produced by the automatic code generator 250. The memory mapping generator 250 may obtain the program information 255 from other files configured by a user, or another system in accordance with a file specification understood by the memory mapping generator 250. The memory mapping generator 230 may read in the linker file's default memory map generated by the automatic code generator 250 to determine program information 255. One ordinarily skilled in the art will appreciate the various types of information that may be defined in the program information 255 to be useful in generating a memory mapping 270 for a program 230, and will recognize the various ways the memory map generator 250 may obtain the program information 255.

The memory information 260 comprises a description of the attributes and physical layout of the memory elements of a computational hardware device, including on-chip memory of one or more processors and/or any external memory elements accessed by one or more processors. Each of these memory elements can be of different types with different access types and rates, configuration, size and other attributes. As such, the memory description 260 may comprise information describing the type of each memory, the access type and rate of each memory, the size of each memory and any other configuration of the memory that may impact the performance of a program 230 storing code and data segments on the one or more memory elements. The memory information 260 may be one or more files generated by a configuration environment of the memory mapping generator 250 or may otherwise be configured in the memory mapping generator 250. The memory mapping generator 250 may obtain the memory information 260 from an interface or API call to another application holding or having access to memory related information of the computational hardware device targeted for implementation by the block diagram model 215. For example, the memory mapping generator 250 may interface with a block diagram modeling environment that produced the block diagram model 215 to obtain such information. In another example, the memory mapping generator 250 interfaces with any device related software, such as an electronic design software tool, to obtain information about the memory of a target device. In one embodiment, the memory information 260 is included with the block diagram model 216 and automatically generated by the automatic code generator 250. One ordinarily skilled in the art will appreciate the various types of memory information 260 relevant to memory mapping and various methods for obtaining such memory information 260.

The memory mapping generator 250 may be configured with one or more optimization algorithms from a set of optimization rules 265. The optimization rules 265 may be a component, module, library or other software component, or any combination thereof configured with optimization algorithms by which the memory mapping generator 250 will apply to generate a memory mapping 270. The memory mapping generator 250 applies the optimization algorithm to compare the program information 255 of a program with the memory information 260 of a computational hardware device to generate an optimal memory mapping 270 for executing the program 230 on the device. A memory mapping 270 is a description of the placement of code and data segments of a program 230 into sections of memory of the computational hardware device. The purpose of the memory mapping generator 270 is to generate a memory mapping 270 that will provide an optimization of the execution of the program on the processor of the device. The optimizations algorithms are applied to the comparison of the program information 2505 to the memory information 260 to achieve the fastest possible execution of the program 230, or a portion of the program 230, on the targeted device, and to determine the memory mapping 270 in the shortest possible time or with the least amount of resources. As discussed above, the automatic code generator 210 uses the memory mapping 270 to build the code into an executable program 230. As such, the program 230 is configured with the memory mapping 270 generated by the memory mapping generator 250 to execute according to the desired performance created by the optimization rules 265.

Figure 2B:
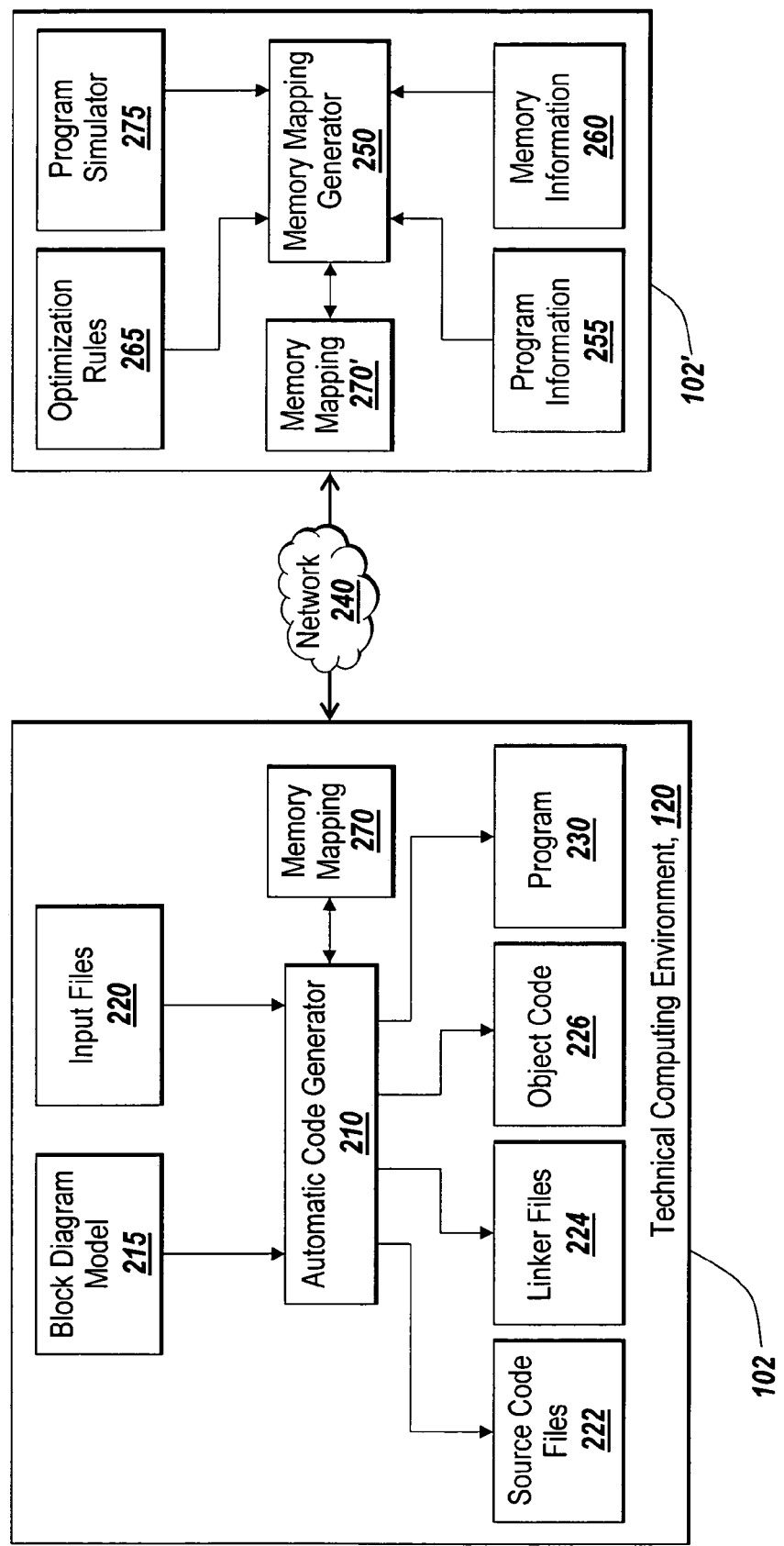
FIG. 2B is a block diagram of the components of another embodiment of the present invention in a computing device.

FIG. 2B depicts a networked system 205 suitable for practicing another illustrative embodiment of the present invention, where functionality and components of the present invention are distributed across multiple computing devices 102 and 102'. In broad overview, FIG. 2B depicts a networked computer system 205 for performing the present invention in a distributed environment. The networked system 205 includes a first computing device 102 in communications over a network 240 with a second computing device 102'. The first computing device and the second computing device 102' can be any type of computing device 102 as described above and respectively configured to be capable of computing and communicating the operations described herein. For example, the first computing device 102 may be a client computer, and the second computing device may be a server computer. In another example, the first computing device 102 may comprise a client having a web browser, and the second computing device 102' may comprise a server running a web server. Furthermore, although discussed generally in terms of a first computing device 102 and a second computing device 102, the networked system 205 may comprise more than two computing devices of which the present invention may have functionality and components distributed and deployed to.

The network 240 can be a local area network (LAN), a metropolitan area network (MAN), or a wide area network (WAN) such as the Internet. In one embodiment (not shown), the network 240 is separated into two or more networks. The networks can be the same type of network or different types of networks. The topology of the network 240 over which the computing devices 102, 102' communicate may be a bus, star, or ring network topology. The network 240 and network topology may be of any such network 240 or network topology capable of supporting the operations of the present invention described herein.

The first computing device 102 and the second computing device 102 can be connected to the network 240 through a variety of connections including, but not limited to, standard telephone lines, LAN or WAN links (e.g., T1, T3, 56 kb, X.25, SNA, DECNET), broadband connections (ISDN, Frame Relay, ATM, Gigabit Ethernet, Ethernet-over-SONET), cluster interconnections (Myrinet), peripheral component interconnections (PCI, PCI-X), and wireless connections, or some combination of any or all of the above. Connections can be established using a variety of communication protocols (e.g., TCP/IP, IPX, SPX, NetBIOS, Ethernet, ARCNET, Fiber Distributed Data Interface (FDDI), RS232, IEEE 802.11, IEEE 802.11a, IEEE 802.11b, IEEE 802.11g, and direct asynchronous connections). The network connection and communication protocol may be of any such network connection or communication protocol capable of supporting the operations of the present invention described herein.

The network 240, network connections and/or protocols may comprise any transmission medium, such as electrical wiring or cabling, fiber optics, electromagnetic radiation or via any other form of transmission medium, between the first computing device 102 and the second computing device 102 capable of supporting the operations of the present invention described herein. The methods and systems of the present invention may also be embodied in the form of computer data signals, program code, or any other type of transmission that is transmitted over the transmission medium, or via any other form of transmission, which may be received, loaded into, and executed, or otherwise processed and used by a computing device 102 to practice the present invention.

In the networked system 205 of FIG. 2B, each of the first computing device 102, e.g., a client, and the second computing device 102', e.g., a server, are configured to and capable of running at least a portion of the present invention. As a distributed application, the present invention may have one or more software components that run on each of the first computing device 102, and the second computing device 102' and work in communication and in collaboration with each other to meet the functionality of the overall application. As by way of example of FIG. 2B, the first computing device 102 may comprise the technical computing environment 120 including an automatic code generator 210, such as Real-Time Workshop®, and the second computing device 102' may comprise the memory mapping generator 250.

As discussed above, the automatic code generator 210 obtains a block diagram model 215 and any input files 220 to translate the blocks of the block diagram model 215 and generate source code representing the functionality configured in the blocks of the block diagram model 215. In the networked system 205, the block diagram model 215 and any input files 220 may be obtained from any computing device 102 on the network 240, for example, they may be downloaded from a web server on the second computing device 102', or over the Internet from another computing device, e.g., a third computing device 102". As also previously discussed, the automatic code generator 210 produces various output files in the form of source code files 222, object code 226, linker files 224 and programs 230. Any of or all of these output files may each be created on, stored in, or otherwise provided to any computing device 102 accessible via the network 240. The automatic code generator 210 may produce a default memory mapping 270 either on the computing device 102 of the technical computing environment 120 or on any other computing device 102 accessible via the network 240. In other cases, the automatic code generator 210 obtains one or more memory mappings 270, such as an optimized memory mapping using the techniques described herein, via the network 240 from the memory mapping generator 250.

With respect to the memory mapping generator 250, the program information 255, the memory information 260, and the optimization rules 265 may be obtained from any computing device 102 accessible via the network 240, such as from a storage, for example, a file or database system. In one embodiment, the program information 255 and the memory information 260 may be obtained via the network 240 from the technical computing environment 120 running on the first computing device 102. The memory mapping generator 250 may generate one or more memory mappings 270' in accordance with the techniques of the present invention. These memory mappings 270' may be stored locally or stored remotely on any other computing device 102 over the network 240. The memory mapping generator 270 may be in communication with the automatic code generator 210 and/or the technical computing environment 120 over the network 240 to either provide or obtain memory mappings 270, 270' using any suitable means. Additionally, the program simulator 275 in communication with the memory mapping generator 250 may run on any other computing device 102 on the network 240

In summary, the technical computing environment 120 and other components of the present invention may be distributed and deployed across one or more different computing devices in various network topologies and configurations. One ordinarily skilled in the art will appreciate the various ways the present invention may be practiced in a distributed manner in a networked system.

Figure 3A:
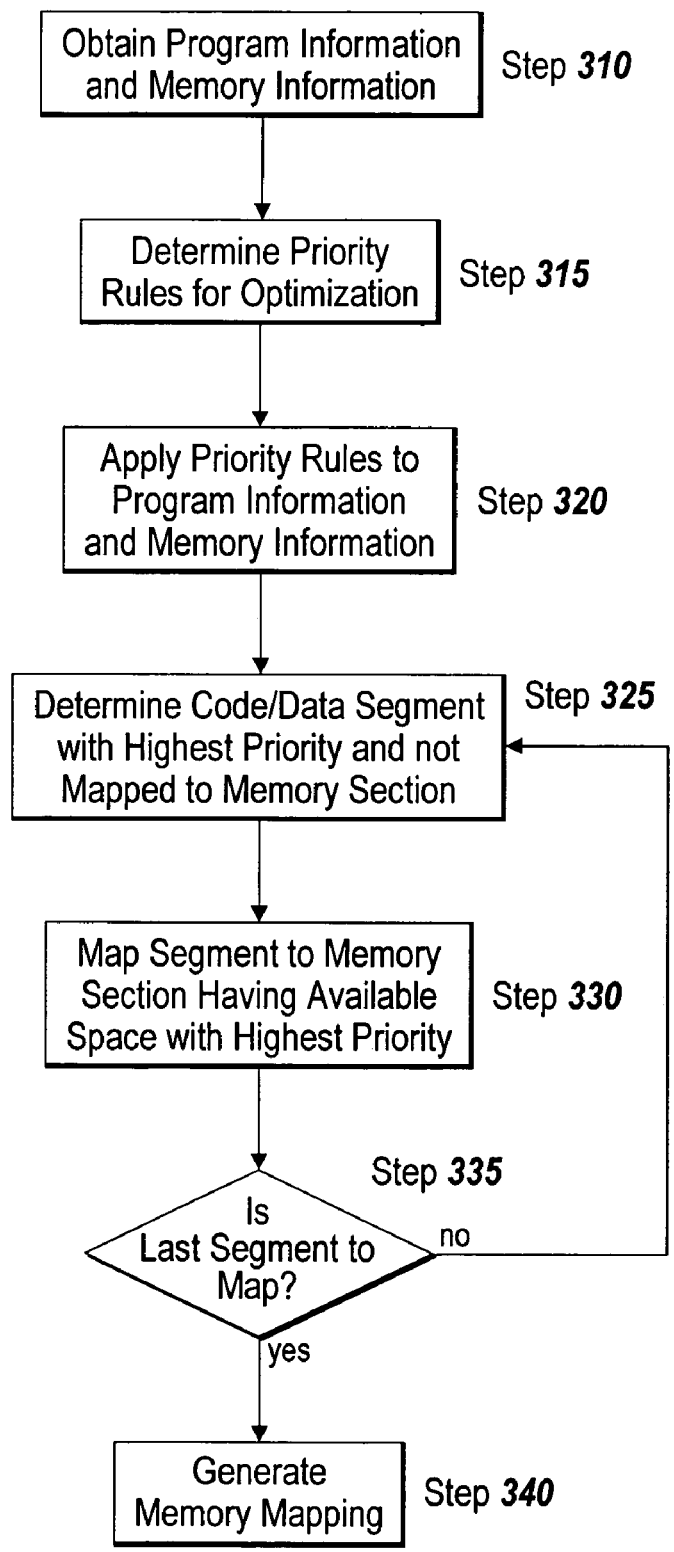
FIG. 3A is a flow diagram depicting steps performed in practicing an illustrative method of the present invention.

In one aspect, the present invention relates to methods of optimization in generating a memory mapping 270. In one embodiment, the optimization rules 265 provide a heuristic approach to generating a memory mapping 270. FIG. 3A depicts an illustrative method of the heuristic approach to optimizing a memory mapping. At step 310 of the method, the program information 255 and memory information 260 is obtained to perform the optimization. The method uses the attributes of the code and data segments of a program 230 defined in the program information 255 and the attributes of the memory in the memory information 260 to generate the appropriate memory mapping 270. At step 315 of the method, prioritization rules are determined to apply to the program information 255 and/or the memory information 260. For example, considering the size and access frequency of each code and data segment of a program 230 placed in a named memory section, a priority of each memory section may be calculated as follows:

> Priority=(w1×size)×(w2×frequency) where w1 and w2 are scalar weighting factors between 0 and 1, providing relative bias to size and frequency parameters Based on the calculated priority, the data and code segments are mapped to the available memory sections using an ordering scheme.

By way of example, a block diagram model 215 may comprise three (3) blocks: block 1, block 2 and block 3. Block 1 is connected to and transfers data to block 2, and block 2 is connected to and transfers data to block 3. The automatic code generator 210 generates uniquely named memory sections for code and data segments in the source code files 222 and object code 226 for each of the three blocks. The code sections associated with blocks 1, 2 and 3 may be uniquely named Code 1, Code 2 and Code 3, respectively. The data sections associated with data buffers between block 1 and block 2 may be uniquely named Data 1, and the data section comprising the data buffering between block 2 and block 3 may be named Data 2. Referring to step 310 of the illustrative method of FIG. 3A, the prioritization rules are applied to the program information 255 for this program 230. For example, the prioritization of the program information 255 may comprise the following:

| Section Name | Size (KB) | Frequency (1/s) | Priority |
|---|---|---|---|
| Code 1 | 1 | 150 | 150 |
| Code 2 | 1.5 | 16 | 24 |
| Code 3 | 5 | 5 | 25 |
| Data 1 | 5 | 25 | 125 |
| Data 2 | 5 | 15 | 75 |

Also at step 310 of the illustrative method, prioritization of the memory may be determined. For example, the memory with the shortest access delay and on a processor may be the first memory to be assigned a code or data segment. In continuing the example, the prioritization of the memory information 260 for a device targeted to run the program 230 may comprise the following:

| Memory | Size (KB) | Memory access delay (wait states) |
|---|---|---|
| Bank A | 2 | 0 |
| Bank B | 64 | 1 |
| Bank C | 1000 | 2 |

Bank A may identify an on-chip memory of a processor of the device, and Bank B and Bank C memory banks external to the processor.

Using the heuristic approach of the illustrative method of FIG. 3A to compare the program information 255 with the memory information 260, the memory mapping generator 250 may apply the optimization rules 265 to compare the assigned priority of code and data sections with the speed and size of available memory. At step 325, the method determines the code or data segment with the highest priority that has not been mapped yet according to the optimization rules 265. For the first time executing step 325, none of the code and data segments have been mapped. In the example, the memory section of Section Code 1 has the highest priority and has a size of 1 KB. The method at step 330 determines the memory section available with the fastest access time (or smallest wait state) and that has memory space available for the code or data segment of the selected named section. In this case, memory Bank A is the fastest memory with space available for Section Code 1. Therefore, Section Code 1 is mapped to a portion of memory Bank A. Since the size of the code section is 1 KB and Bank A has 2 KB of memory, there is 1 KB of memory space available on Bank A for mapping an additional code or data segment.

In a similar manner, steps 325 and 330 are repeated until all the code and data segments of named memory sections are mapped to an available portion of memory. The following is an illustrative description of the repetition of steps 325 through steps 335 in reference to the example:

Section Code 1 has highest priority and fits in the fastest access memory of Bank A Section Code 2 does not fit in the fastest access memory of Bank A with Code 1, therefore place it in next fastest access of Bank B Section Data 1 does not fit in the fastest access memory of Bank A with Code 1, therefore place it in next fastest access of Bank B Section Code 3 does not fit in the fastest access memory of Bank A with Code 1, therefore place it in next fastest access of Bank B Section Data 2 does not fit into Bank A nor Bank B based on the code and data segments already assigned to Bank A and Bank B, therefore place it in the next available memory of Bank C In other embodiments, the method may only repeat steps 325 and 330 for a portion of the code and data segments of a program 230. In a further embodiment, the method may only repeat steps 325 and 330 for a selected set of code and data segments. In yet another embodiment, the method may, at step 335, stop repeating steps 325 and 330 if the available memory has been exhausted. After applying the optimization rules to the last code or data segment to be optimized, the memory mapping generator 250, at step 340 of the illustrative method of FIG. 3A, produces the following optimized memory mapping 270:

| Memory | Sections | Unused Memory |
|--------|----------|---------------|
| Bank A | Code 1 | 1 KB |
| Bank B | Code 2, Data 1, Code 3 | 11.5 KB |
| Bank C | Data 2 | 925 KB |

The optimization rules 265 for the heuristic approach could be configured with a more advanced algorithm that would apply a different priority scheme. For example, the optimization rules 265 may also consider unused memory and put a code or data section with a lower priority into a faster access memory area to reduce the amount of unused memory with higher access rates. In another example, the optimization rules 265 may call for re-sectioning of code and data segments to better utilize faster memory. One ordinarily skilled in the art will recognize the various prioritization schemes that may be configured in the optimization rules 265 to apply to this approach. Using the heuristic approach may not always result is the most optimal memory mapping but the resulting optimization of the memory mapping 270 will suffice for most real-time requirements of applications.

In another embodiment, the optimization rules 265 provide a deterministic approach to generating a memory mapping 270. This approach requires a program simulator with memory timing and profiling capabilities. As depicted in FIG. 2A, the memory mapping generator 250 may interface and interact with a program simulator 275 to obtain simulated execution times for a program 230 using a memory mapping 270 implemented with a target processor. The program simulator 275 may comprise an instruction set simulator designed to simulate and provide execution profiling of the processor targeted to execute the program 230. Typically, an instruction set simulator performs the fetch-decode-execute cycle for the target CPU's instruction set on the processor, and may include all the target processor's registers and system state to provide a more complete model of the target processor. One ordinarily skilled in the art will recognize the various types of program simulators 275 that may be deployed to determine program execution times on a target processor or other timing profiles related to a program 230.

Figure 3B:
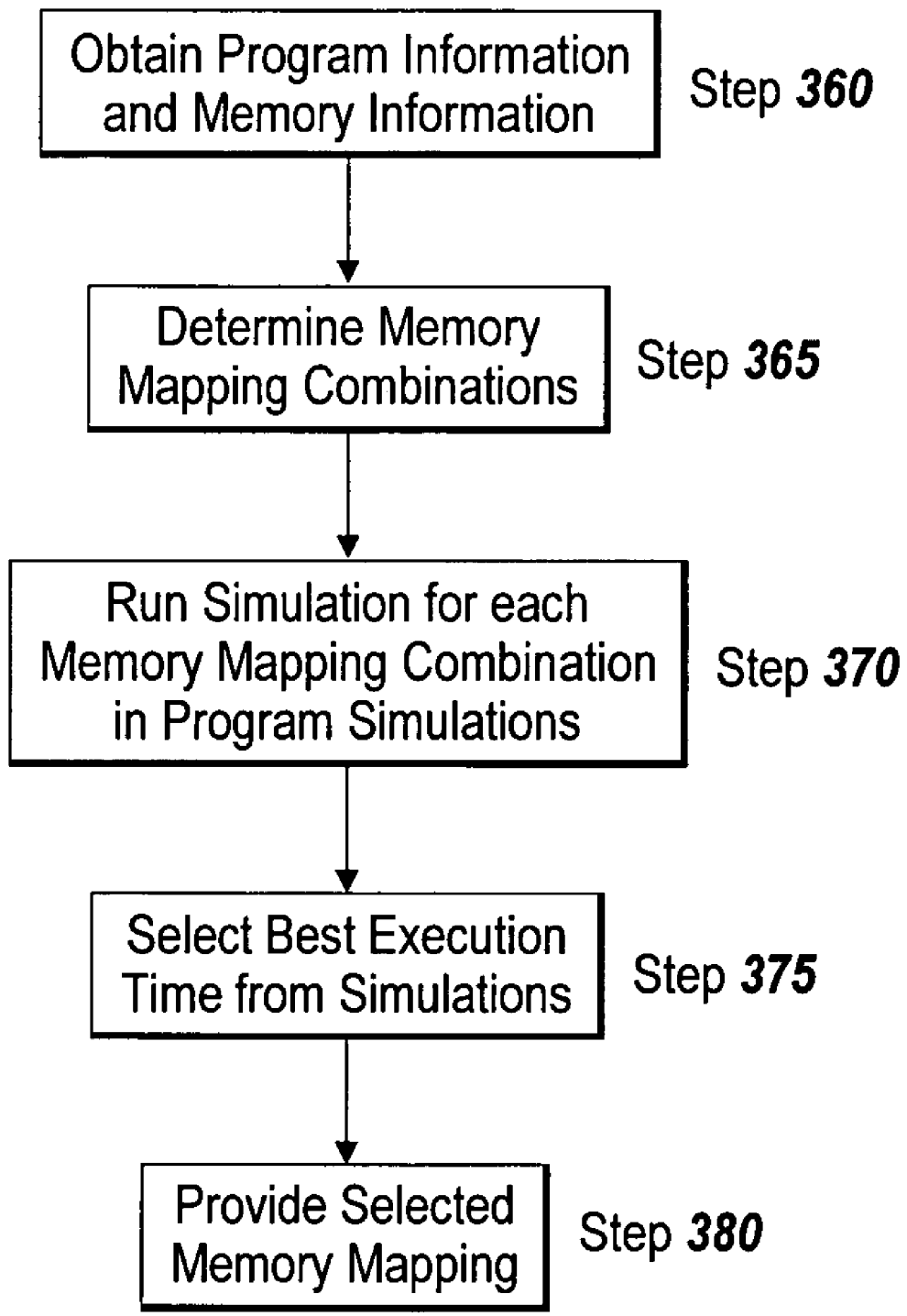
FIG. 3B is a flow diagram depicting steps performed in practicing another illustrative method of the present invention.

Referring now to FIG. 3B, an illustrative method of using a deterministic or exhaustive type approach to optimizing a memory mapping 270 is depicted. At step 360 of the method, the program information 255 and memory information 260 is obtained to determine one or more combinations of memory mappings 270 to simulate. At step 365, the memory mapping generator 250 can determine all the possible variations of memory mappings 270 from the program information 255, or, in another embodiment, may determine a portion of all the possible memory mappings 270. In another embodiment, the illustrative method may generate multiple versions of a memory mapping determined by the heuristic method discussed in conjunction with FIG. 3A.

At step 370 of the method, the memory mapping generator 250 can simulate the execution of instructions for the program 230 on the program simulator 275 based on any of the memory mapping versions determined at step 365. Furthermore, the memory mapping generator 250 can generate and run on the program simulator 275 all the possible memory mapping 270 versions that may occur with a set of program information 255 and memory information 260. The simulations on the program simulator 275 will produce profiles of execution times for each of the simulations associated with a version of a memory mapping 270. Then, at step 380, the memory mapping generator 250 can select the memory mapping 270 that provided the best performance based on the time results from the simulations on the program simulator 275.

For example, assuming a block diagram model 215 with synchronous task scheduling, an optimal memory mapping 270 can be determined by running all memory mapping 270 versions. Memory information 265 of a device targeted to implement the design of the block diagram model 215 may may comprise n memory types or n memory elements with different access speeds. The program information 255 of the program 230 generated from the block diagram model 215 may comprise m memory sections of code and data segments. Therefore, the memory mapping generator 250 can generate up to $n^m$ different memory mappings 270. The memory mapping generator 250 would run each of the $n^m$ different memory mappings 270 on the program simulator 275 and select the memory mapping 270 with the best execution performance. In another embodiment, the memory mapping generator 275 may run through the combinations of memory mappings 270 until the first memory mapping 270 meeting a desired performance criteria is determined. Although this deterministic approach can guarantee determining the memory mapping 270 with the fastest execution time, if there is a large number of memory mapping 270 versions to run in the program simulator 275 it may be costly in time and resources.

In a further embodiment, the optimization rules 265 uses a genetic type algorithm search that combines characteristics of the heuristic type method of FIG. 3A and the exhaustive type method of FIG. 3B discussed above. The memory mapping generator 270 will run timing simulations on the program simulator 275 for those combinations determined by a heuristic comparison between the program information 255 and the memory information 265. The heuristic comparison will result in a subset of memory mappings 270 as compared to all the possible versions of memory mappings 270 from the exhaustive approach. This has advantages over the exhaustive search since it is much less-time consuming. This also has advantages over the heuristic approach in that it will generate a memory mapping 270 with performance approaching the performance of the optimal memory mapping. More advanced memory mapping algorithms can be configured in the optimization rules 265 using additional information, such as memory banking requirements and iterative mapping schemes.

Although generally discussed in terms of determining a memory mapping 270 for the code and data segments of an entire program 230 for a block diagram model 215, the memory mapping generator 250 can generate memory mappings 270 for portions of the program 230. The memory mapping generator 250 may generate a memory mapping 270 for any user-specified granularity such as a specific function, a specific set of functions, specific data buffer or set of global data buffers. In these cases, the optimization rules 265 can be configured to specify optimization algorithms for these types of granularities. The memory mapping generator 250, with any of the combination of optimization approaches discussed above, can generate a memory mapping 270 for optimal performance for the portion of a program 270 being optimized. For example, a specific function and data buffer can be optimized for fastest execution time regardless of the execution times that will result in other code and data segments. The memory mapping 270 provided to the automatic code generator 250 may provide mapping information just for the specific function and data buffer. Additionally, the memory mapping 270 may include default mapping information, for example, from the linker, for the code and data segments not optimized by the memory mapping generator 250.

Furthermore, although the optimization approaches generally discuss code and data segments of a single program running on a single processor, the memory mapping generator 250 and the optimization rules 265 may also include algorithms for determining memory mappings 270 for multiple programs 230, 230' accessing the same memory elements such as a memory element acting as a shared memory resource. In these cases, the memory mapping generator 250 considers that a code and data segment of one program 230 cannot be targeted to be stored in a memory location already targeted to store a code or data segment of a second program. Furthermore, the memory mapping generator 270 will need to consider the program information and the memory information of each of the programs together to determine optimal memory mappings. In the case of the optimization rules 265 configured with characteristics of the exhaustive approach, the memory mapping generator 250 will need to simulate on the program simulator 275 timing results for both programs accessing shared memory and concurrently operating on the computational hardware device.

Figure 4:
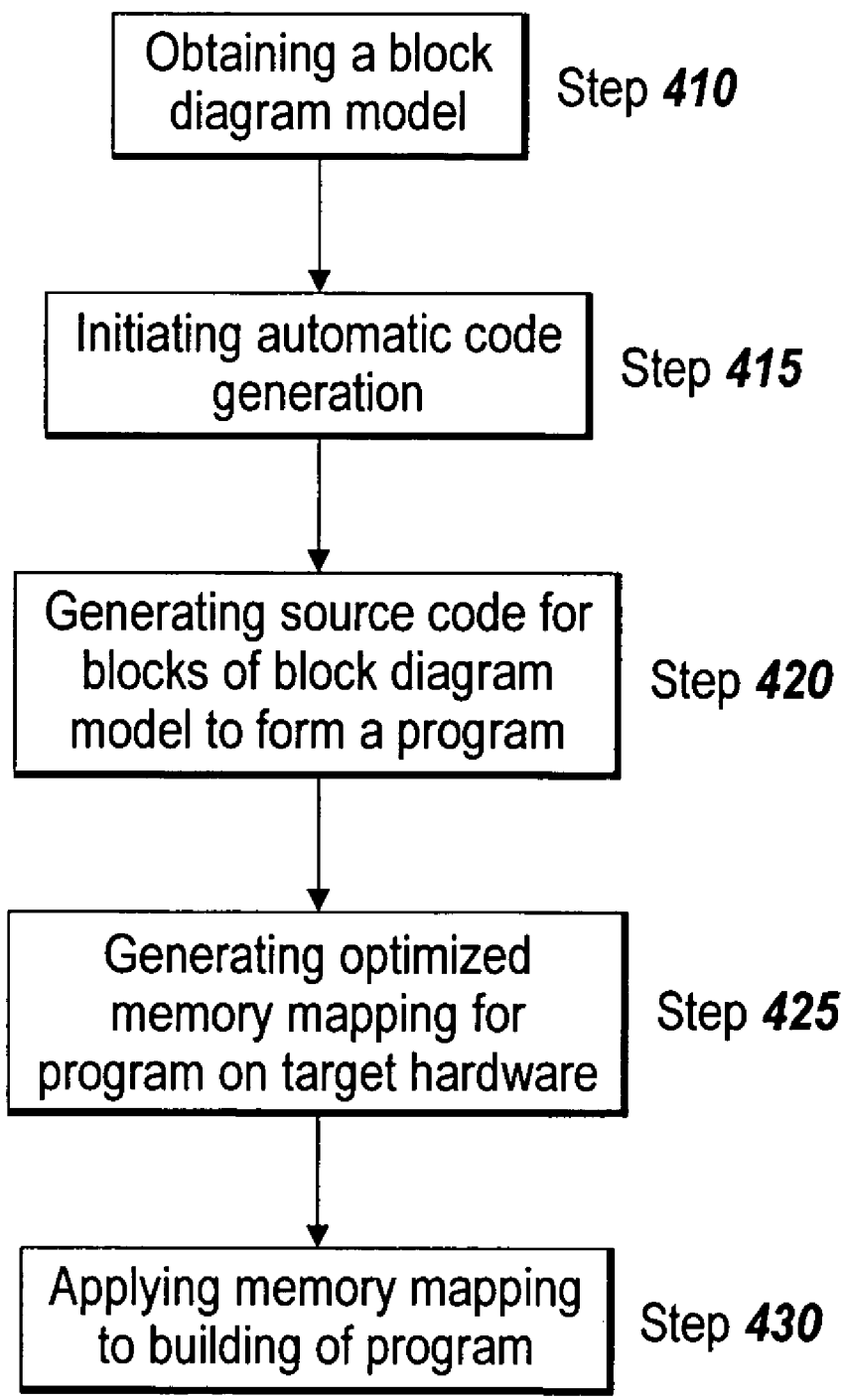
FIG. 4 is a flow diagram illustrating steps performed in practicing an embodiment of the present invention as depicted in FIG. 2A or FIG. 2B.

In another aspect, the present invention relates to a method of automatically generating a program 230 from a block diagram model 215 and automatically generating an optimized memory mapping 270 to incorporate into the automatic generation of the program 230. The flow diagram of FIG. 4 depicts an illustrative method 400 for practicing an embodiment of the present invention as described in FIG. 2A. Method 400 includes the steps of obtaining a block diagram model 215 (step 410), and initiating an automatic code generation process (step 415) to translate the functionality of the block diagram model 215 into a software implementation. At step 420, the automatic code generation process generates source code for each block of the block diagram model 215 by placing the code and data segments associated with each block into a named memory section. For each of the blocks, the automatic code generation process generates one or more program instructions in source code files 222. The source code files 222 direct a compiler to use named memory sections for code and data segments generated for each of the blocks. The automatic code generation process then compiles the source code files 222 into object code 226.

At step 425, an optimized memory mapping 270 is generated from program information 255 associated with the program 230 being automatically generated, and from memory information 260 describing the memory of the hardware targeted to execute the program 230. During the optimization of the memory mapping 270, one or more different types of optimization algorithms contained in the optimization rules 265 can determine a memory mapping 270. The optimization algorithm determines the placement of the code and data segments of named memory sections into the portions of the memory of the target device and generates an optimized memory mapping 270. The optimized memory mapping 270 represents an optimization of the performance of an execution of the program 230 on the processor of the target device.

At step 430, the automatic code generation process obtains the optimized memory mapping 270. The memory mapping 270 may be provided in a linker command file 224. In another embodiment, the automatic code generation process generates a linker command file 224 implementing the obtained memory mapping 270. The automatic code generation process can then build the program 230 with a linking utility using the linker command file 224 and object files 222. Since the linker command file 224 implements the optimized memory mapping 270, the built program 230 incorporates the optimized memory mapping 270.

Although the illustrative method 400 is discussed in terms of generating a program 239 from a block diagram model 215 incorporating an optimized memory mapping 270, the steps of the method 400 can be applied in a like manner to one more block diagram models 215 representing multiple programs to run on a plurality of processors accessing memory that may be shared between the processors. As such, the steps of method 400 can be applied repetitively in one execution of the automatic code generator 210 and/or memory mapping generator 250, or repetitively by multiple executions of the automatic code generator 210 and/or memory mapping generator 205. Furthermore, the present invention can also be applied to generate memory mappings 270 for programs to run on components that are on different target devices. For example, the block diagram model 215 may represent a two processor design with each processor on separate target devices. The systems and methods described herein can generate a program from the block diagram model 215 for each of the processors on different targets and have the programs incorporate the memory mapping techniques of the present invention Additionally, either the memory mapping generator 250 or the automatic code generator 210 may provide a graphical user interface to allow a user to select one or more of the optimizations determined by the memory mapping generator 250 for any of the code and data memory sections of the program 230. In another embodiment, the graphical user interface may allow the user to select user preferred mappings to map the named memory sections to the memory structure of the target device. In a further embodiment, the graphical user interface may allow the user to edit or otherwise rearrange the optimizations provided by the memory mapping generator 250. In this manner, the user can exercise control over the optimization on a granular basis. The optimizations selected by the user then would be incorporated in either the memory mapping 270 provided to the automatic code generator 210 or otherwise implemented in the linker command files 224 to build the program 230.

Figure 5:
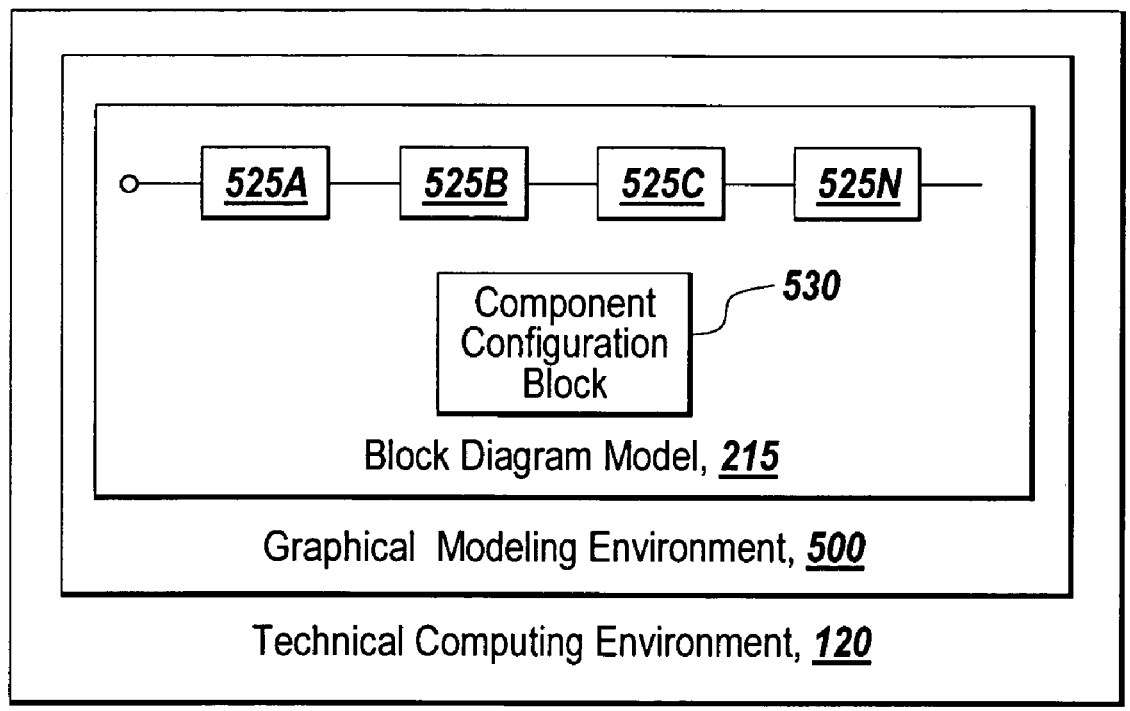
FIG. 5 is a block diagram of an illustrative graphical model of another embodiment of the present invention.

By way of example, FIG. 5 depicts a graphical modeling environment 520, such as Simulink®, of the technical computing environment 120. The graphical modeling environment 520 may obtain or provide a block diagram model 215 that may have one or more blocks 525a-525n. The design represented by the functionality, algorithms or computations of the blocks 525a-525n may be targeted for one or more computational hardware devices, such as a an embedded hardware or processing platform. The graphical modeling environment 520 may provide a configuration mechanism to include a component configuration block 530 in the block diagram model 215. The component configuration block 530 allows for registering the component types and the physical memory layout of the target device. Furthermore, the component configuration block 530 allows a user to specify custom memory mappings for generated code to the target device. A component configuration block 530 may be preconfigured or pre-populated to represent a specific component, such as a specific type of processor. For example, the component configuration block 530 may be a component configuration block to represent a Motorola processor. Also, the component configuration block 530 may be configurable to represent one or more components, such as a list of component types registered with or otherwise known by the graphical modeling environment 520. Although a component configuration block 530 is generally discussed in terms of being a block of the block diagram model 215, the component configuration block 530 may comprise any type of graphical element, such as an icon, that may be placed in or otherwise associated with the block diagram model 215. Alternatively, the component configuration block 530 may instead be any type of configurable element provided by the graphical modeling environment 520 that can be associated with a block diagram model 215, such a graphical user interface form, a file, or any other configurable or editable element suitable for performing the operations described herein.

One or more component configuration blocks 530 may be associated with the block diagram model 215 to allow the same design of the block diagram model 215 be configured for code generation to multiple target devices using the memory mapping techniques of the present invention. For example, one component configuration block 530 may represent and be configured for a first type of processor and a second component configuration block 530 may represent and be configured for a second type of processor. This will allow the block diagram model to have code generated incorporating an optimized memory mapping for any target having a component configuration block 530 associated with the block diagram model 215. Also, if the design of the block diagram model 215 is targeted for a multiple component device, such as an embedded system with multiple processors of different types, code and memory maps for portions of the design can be generated for the multiple processors from the same block diagram model 215.

Figure 6:
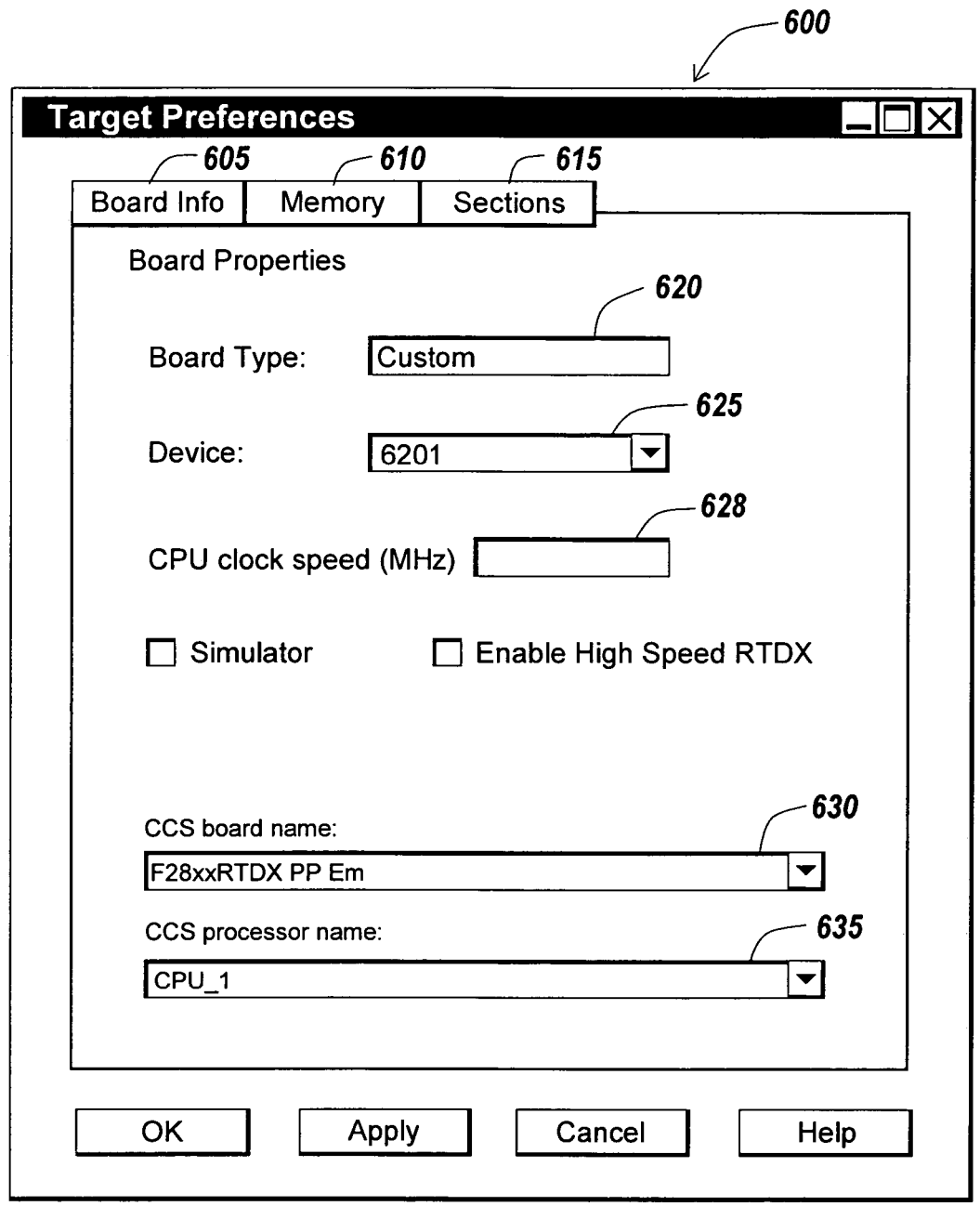
FIGS. 6, 7 and 8 are block diagrams of illustrative graphical user interfaces of other embodiments of the present invention.
Figure 7:
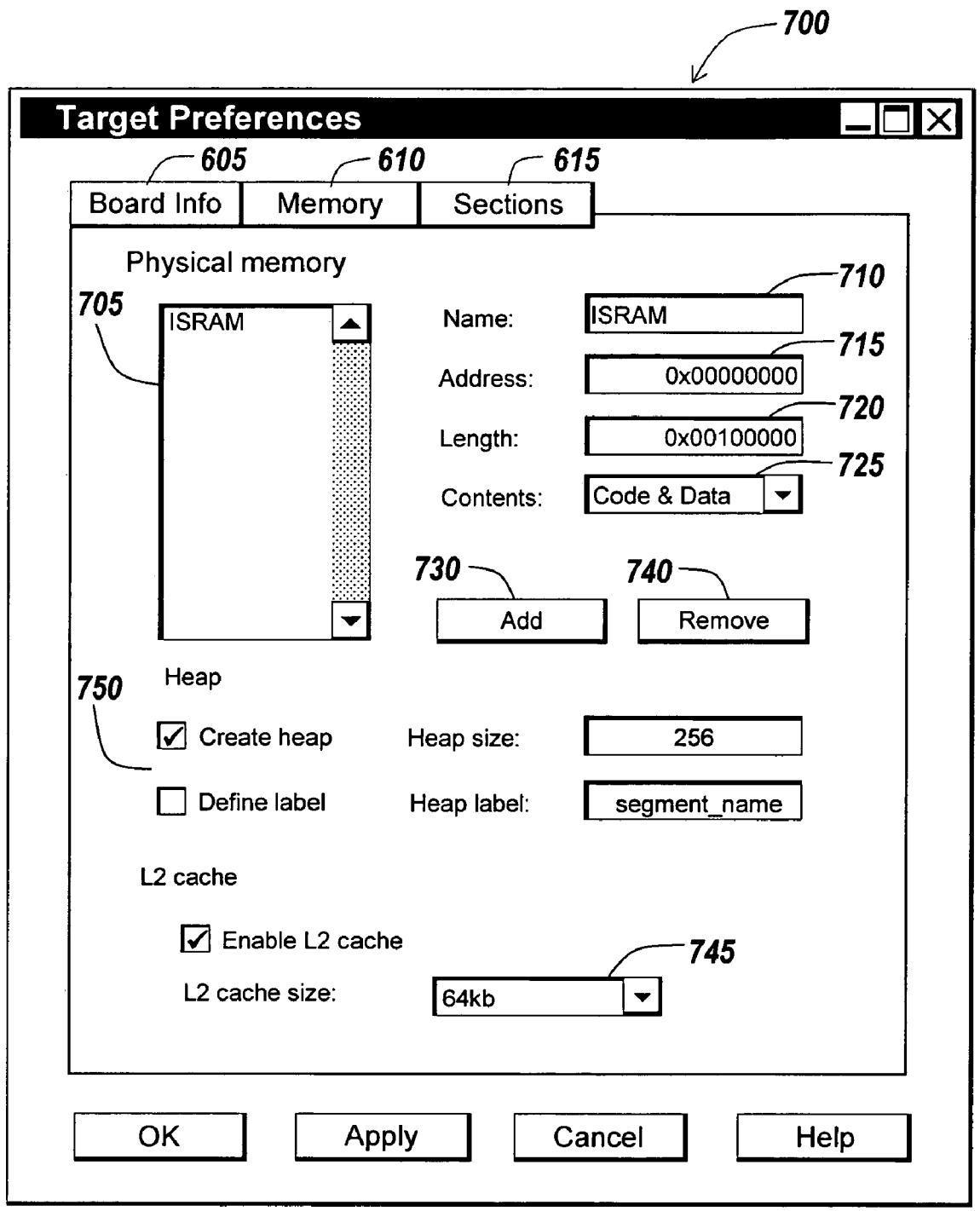
Figure 8:
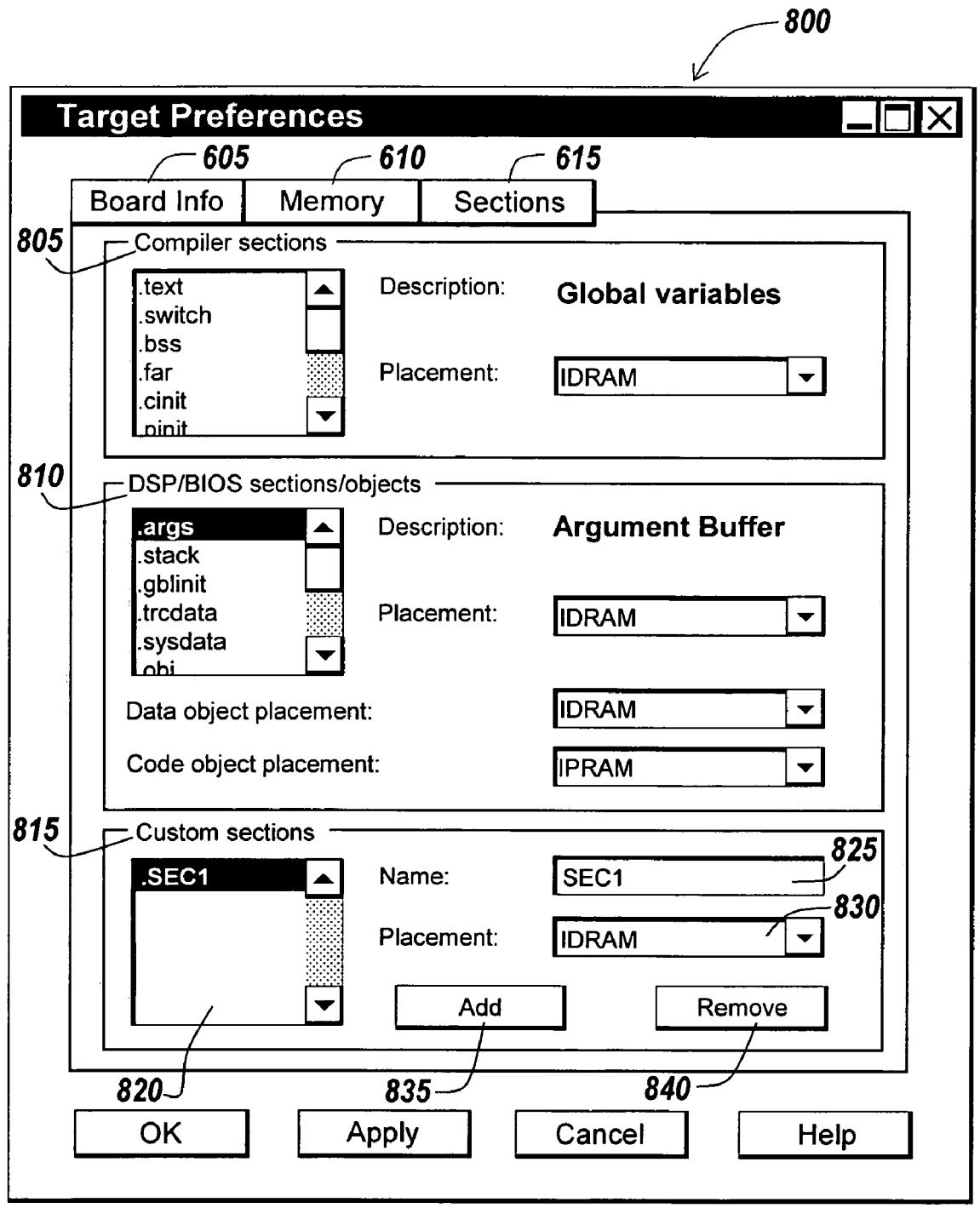

FIGS. 6 through 8 depict graphical user interface forms for specifying and configuring user specific or custom memory mappings associated with a component configuration block 530 in accordance with an illustrative embodiment of the present invention. FIG. 6 depicts a board information graphical user interface 600 for configuring board properties related to the target device of the component configuration block 530. FIG. 7 depicts a memory configuration graphical user interface 700 for configuring the physical memory layout of one or more memory elements of the target device. FIG. 8 depicts a memory mapping graphical user interface 800 for defining the actual mapping of program sections to physical memory of the target device. In an exemplary embodiment, the graphical user interface forms 600, 700 and 800 are tabs of a single multi-tab graphical user interface form, although they can be provided together or separately in any suitable form. For example, graphical user interface 600 of FIG. 6 shows a board information tab 605, a memory tab 610 and a sections tab 615. Accordingly, the board information graphical user interface 600 is associated with the board information tab 605, the memory configuration graphical user interface 700 is associated with the memory tab 610, and the memory mapping graphical user interface is associated with the sections tab 615. Additionally, in the exemplary embodiment, the component configuration block 530 is selectable to invoke one or more of these graphical user interface forms 600, 700 and 800. Alternatively, the graphical user interface forms 600, 700, and 800 may otherwise be invoked by any other suitable means provided by the graphical modeling environment 520. With respect to the description of the graphical user interfaces 600, 700, and 800 to follow, one ordinarily skilled in the art will appreciate and recognize the various ways these graphical user interfaces may be implemented to support the operations of the present invention as described herein. One ordinarily skilled in the art will appreciate that the configuration shown by these graphical user interface may be provided by any other suitable means.

Referring now to FIG. 6, the board information graphical user interface 600 provides as illustrative example of several configurable and editable graphical user interface widgets for defining board related properties of a target computational hardware device. The board type edit widget 620 allows a user to specify the type of board. The device choose list widget 625 allows a user to specify the type of processor, and the CPU clock speed widget 628 allows the user to specify the CPU speed of the processor. From the selection of the processor type from the device choose list widget 625, the systems and method of the present invention may determine the internal memory information of the processor. This information may form a portion of the memory information 260 used by the memory mapping generator 270. The board information graphical user interface 600 also provides a board name choose list widget 630 and a processor name choose list widget 635, which specifies the name of the target board and processor for the block diagram model 215 associated with the component configuration widget 530. Although the board information graphical user interface 600 of FIG. 6 shows a screen for configuring a single processor, the board information graphical user interface 600 may provide additional widgets for defining board related properties for boards with multiple processors. For example, there may be additional device choose list widgets 625, CPU clock speed widgets 628, board name choose list widgets 630, and processor name choose list widgets 635.

Referring now to FIG. 7, the memory configuration graphical user interface 700 provides as illustrative example of several configurable and editable graphical user interface widgets for defining the physical memory layout of a target computational hardware device. The physical memory choose list widget 705 provides a list of physical memory elements of the target computational hardware device as related to the board properties defined in the graphical user interface 600 for the board info tab 605. The graphical user interface 700 may be configured with or otherwise provide a list of physical memory elements to have the user define the physical memory layout. The default names assigned or given to the physical memory elements may be configured in the technical modeling environment 120, may follow a pre-determined or configured naming convention, or may be provided by any suitable means. Otherwise, the graphical user interface 700 may allow the user to edit, add or otherwise specify names to give to portions of the physical memory elements.

The name widget 710 allows a user to specify the name of a portion of the physical memory layout to which to configure memory size attributes. The address widget 715 and the address length widget 720 allow the user to specify memory size attributes for the selected physical memory. The contents choose list widget 725 allows the user to select the type of contents for the physical memory layout specified by widgets 710, 715 and 720, such as code and data segments of the program segments generated from a block diagram model 215 in accordance with the present invention. After providing the name, address, length and contents of a portion of physical memory, the add command button 730 may be invoked to add this to the physical memory layout configuration for this target device. This will cause the newly named portion of physical memory with the name specified in the name widget 710 to appear in the physical memory choose list widget 705. A named portion of the physical memory layout can be selected from the physical memory choose list widget 705 and widgets 710, 715 and 720 will be updated accordingly with the current configuration for that named memory element. The remove command button 740 may be invoked to remove this named memory portion from the configuration for the board. Accordingly, the memory configuration graphical user interface 700 removes this selection from the physical memory choose list widget 705. Additionally, in the heap section 750 the user can specify heap related information with regards to the named memory portion, and via the cache widget 745 the user can specify an optional cache size. The memory configuration graphical user interface 700 may save, or otherwise provide this configuration information to form the memory information 260 in accordance with the present invention. With the configurability illustrated by the memory configuration graphical user interface 700, the user can arrange the physical memory layout in any desired arrangement with any desired granularity. This provides great flexibility and control for mapping code and data sections as discussed below with regards to FIG. 8.

Referring now to FIG. 8, the memory mapping graphical user interface 800 provides as illustrative example of several configurable and editable graphical user interface widgets for mapping the program segments of a program to the configured memory physical layout of the target device as configured in the memory configuration graphical user interface 700 associated with the memory tab 610. For example, program segments from code 226 for a program 230 generated from a block diagram model 215 may be mapped to the configured physical memory layout. The compiler section 805 and the processor section 810 of the graphical user interface 800 allow the user to map default code and data sections to desired memory elements as configured in memory tab 610. These default code and data sections may represent the standard named memory sections in the object code 226 generated by default by the compiler as discussed above with regards to the use of #pragma compiler directive. In the custom section 815, custom named memory sections in the object code 226 may be mapped to the desired memory elements. The custom named memory sections may comprise code and/or data segments representing the code 226 generated from the block diagram model 215.

The name widget 825 comprises a mechanism to specify the name of a custom memory section, and the placement widget 830 comprises a choose list of the named memory elements as configured via the memory configuration graphical user interface 700. This identifies the area in memory the custom section will be placed. As shown in the example of FIG. 8, the custom memory section named .SEC1 is specified in the name widget 825. When the add command button 835 is invoked, the named memory section of .SEC1 is configured to be mapped to, or otherwise targeted to be placed, in the named memory element of IDRAM selected in the placement widget 830. The remove command button 840 can be used to remove any custom section mappings. The user can create and map any of the custom named memory sections of object code 226 generated by the automatic code generator 210 to form a memory mapping 270. In this manner, the memory mapping 270 may be generated to incorporate into the building of a program so that it executes in a desired manner. Although FIG. 8 shows an example where the user specifies and adds a named memory section, the memory mapping graphical user interface 800 may provide a list of custom named memory sections, generated automatically or by any suitable means in accordance with the present invention. These provided named memory sections may follow a predetermined or configured naming convention. In this manner, the user may not desire to specify the name of the custom memory section, but can still configure the memory mapping to place the custom memory sections, with a provided name, to the desired portion of memory.

Furthermore, although the memory mapping graphical user interface 800 is discussed in terms of a user configuring the memory mapping 270 to place the named memory sections of the code in one or more memory elements, the memory mapping graphical user interface 800 could display one or more optimized memory mappings 270 generated by the memory mapping generator 250. For example, when the memory mapping graphical user interface 800 is invoked it may be populated with an optimized memory mapping 270 provided by the memory mapping generator 250. In other embodiments, the graphical user interface 800 may use memory mappings 270 generated from any other source, such as a program, application, method, mechanism, environment, etc. In one embodiment, the graphical user interface 200 may use a memory mapping 270 generated by another type of memory mapping mechanism. As such, the custom section 810 may be populated with the named memory sections of the object code 226 provided by the automatic code generator 210. In a similar manner, the memory configuration graphical user interface 700 may be pre-populated with a physical memory layout obtained from memory information 260 in accordance with the present invention. The user then may be able to select, modify, remove or otherwise determine which memory mapping 270, or which portion thereof, to use for a target device.

In a summary view of the structure, functions and operations of the technical computing environment 120 as described herein, the present invention provides a systematic approach for generating an optimized memory mapping to incorporate into the automatic source code generation of a block diagram model. The present invention handles memory mapping of programs to be implemented on multi-component heterogeneous computational hardware devices such as a multi-processor embedded control system with shared memory. From a block diagram model, software can be automatically implemented and optimized to execute on the target hardware. With changes in the algorithm of the design reflected in a block diagram model, the program can be automatically generated with an automatically determined memory mapping optimized for the new design. Furthermore, if the memory topology of the device changes, the program can also be automatically regenerated with a new memory mapping optimized for the new memory layout of the hardware. Moreover, the block diagram model design can remain the same but have the programs and memory mapping re-targeted to a different device. From the same design, a new program and memory mapping can be automatically generated for the new target device. As such, the systems and method described herein greatly improve the time and efficiency of software design and development from a block diagram model to optimize software implementations.

Many alterations and modifications may be made by those having ordinary skill in the art without departing from the spirit and scope of the invention. Therefore, it must be expressly understood that the illustrated embodiments have been shown only for the purposes of example and should not be taken as limiting the invention, which is defined by the following claims. These claims are to be read as including what they set forth literally and also those equivalent elements which are insubstantially different, even though not identical in other respects to what is shown and described in the above illustrations.

What is claimed is:

1. In an electronic device, a method for determining a memory mapping for executable instructions generated from a graphical model to execute on a computational hardware device having one or more processors, the method comprising:
   receiving program information comprising a description of one or more program segments, each program segment comprising one of a code segment and a data segment of executable instructions generated from a graphical model;
   receiving memory information comprising a description of one or more memory elements of the computational hardware device; and
   using the program information and the memory information to determine a memory mapping that provides for executing the executable instructions in a desired manner on the computational hardware device, the memory mapping identifying placement of the one or more program segments to portions of the one or more memory elements.

2. The method of claim 1, wherein a memory mapping generator automatically determines the memory mapping to provide the memory mapping to form an executable of the executable instructions incorporating the memory mapping.

3. The method of claim 1, wherein the program information comprises a description of one or more of the following: a size of one of the code segment and the data segment, a frequency of access by the executable instructions to one of the code segment and the data segment, and a priority associated with one of the code segment and the data segment.

4. The method of claim 1, wherein the memory information comprises a description of one or more of the following: a size of a memory element, an access rate of the memory element, and a configuration of the memory element.

5. The method of claim 1, wherein the determining comprises:
   applying an optimization algorithm of one of a heuristic type, an exhaustive type, and a genetic type.

6. The method of claim 1, wherein the determining comprises:
   determining from the program information a first program segment having a first priority, and determining from the memory information a first memory portion of the one or more memory elements having a first desired characteristic;
   assigning the first program segment to the first memory portion;
   determining from the program information a second program segment having a second priority, and determining from the memory information a second memory portion of the one or more memory elements having one of the first desired characteristic and a second desired characteristic; and
   assigning the second program segment to the second memory portion.

7. The method of claim 6, wherein the first priority of the first program segment and the second priority of the second program segment is determined from one of a size of the program segment and a frequency of access by the executable instructions to the program segment.

8. The method of claim 1, wherein the determining comprises:
   obtaining a first memory mapping from a plurality of memory mappings for executing the executable instructions on the computational hardware device;
   determining a first time profile from executing on a program simulator the program incorporating the first memory mapping; and
   determining from the first time profile if the first memory mapping provides a desired time profile.

9. The method of claim 8, further comprising:
   obtaining a second memory mapping from the plurality of memory mappings for executing the executable instructions on the computational hardware device;
   determining a second time profile from executing on the program simulator the executable instructions incorporating the second memory mapping; and
   comparing the first time profile to the second time profile to determine the one of the first memory mapping and the second memory mapping having the desired time profile.

10. In an electronic device, a method for generating code from a graphical model to incorporate a memory mapping for executable instructions to run on a computational hardware device, the method comprising:
    initiating an automatic generation of code from a graphical model to provide executable instructions to run on a computational hardware device having one or more processors;
    assigning one of a code segment and a data segment of the generated code to a named memory section to be associated with a memory element of the computational hardware device, the code and data segment representing at least a portion of functionality of the graphical model;
    obtaining a memory mapping providing an optimization of execution of the executable instructions on the computational hardware device, the memory mapping describing a placement of one of the code segment and the data segment to a portion of a memory element of the computational hardware device; and
    providing a linker file to associate, in building an executable from the executable instructions, the named memory section with the portion of the memory element as determined by the memory mapping.

11. The method of claim 10, wherein the method comprises building an executable from the executable instructions with the linker file to incorporate the memory mapping.

12. The method of claim 10, wherein the automatic generation of code assigns one of the code segment and the data segment to the named memory section via one of a compiler directive and a linker directive.

13. In an electronic device, a method for automatically generating code for a graphical model and determining a memory mapping for the execution of instructions on a computational hardware device having one or more processors, the method comprising:
    initiating an automatic generation of code from a graphical model to provide executable instructions to execute on the computational hardware device, the automatic generation of code providing one or more compiler directives to place one of a code segment and a data segment of the executable instructions into a named memory section, the code segment and the data segment representing at least a portion of functionality of the graphical model;

obtaining program information comprising a description of one or more code and data segments of the executable instructions;

obtaining memory information comprising a description of one or more memory elements of the computational hardware device;

determining a memory mapping providing for executing the executable instructions in a desired manner on the computational hardware device, the memory mapping automatically generated from a comparison between the program information and the memory information to determine a placement of one or more code and data segments of the executable instructions to portions of the one or more memory elements of the computational hardware device; and providing a linker file to associate the named memory section with the portion of the memory element as determined by the memory mapping.

14. The method of claim 13, wherein the program information comprises a description of one or more of the following: a size of one of the code segment and the data segment, a frequency of access by the executable instructions to one of the code segment and the data segment, and a priority associated with one of the code segment and the data segment.

15. The method of claim 13, wherein the memory information comprises a description of one or more of the following: a size of a memory element, an access rate of the memory element, and a configuration of the memory element.

16. The method of claim 13, wherein automatically generating the memory mapping comprises:

determining from the program information a first program segment having a first priority, and determining from the memory information a first memory portion of the one or more memory elements having a first desired characteristic;

assigning the first program segment to the first memory portion;

determining from the program information a second program segment having a second priority, and determining from the memory information a second memory portion of the one or more memory elements having one of the first desired characteristic and a second desired characteristic;

assigning the second program segment to the second memory portion; and providing as the memory mapping a memory mapping identifying the assignment of the first program segment and the second program segment.

17. The method of claim 16, wherein the first priority of the first program segment and the second priority of the second program segment is determined from one of a size of the program segment and a frequency of access by the executable instructions to the program segment.

18. The method of claim 16, wherein automatically generating the memory mapping comprises:

obtaining a first memory mapping from a plurality of memory mappings for executing the executable instructions on the computational hardware device;

determining a first time profile from executing on a program simulator the executable instructions incorporating the first memory mapping; and determining if the first memory mapping provides a desired time profile from the first time profile.

19. The method of claim 18, further comprising:

obtaining a second memory mapping from the plurality of memory mappings for executing the executable instructions on the computational hardware device;

determining a second time profile from executing on the program simulator the executable instructions incorporating the second memory mapping; and comparing the first time profile to the second time profile to determine the one of the first memory mapping and the second memory mapping having the desired time profile.

20. A system to generate executable instructions for a graphical model and to determine a memory mapping for the execution of the executable instructions on a computational hardware device, the system comprising:

an automatic code generator generating code from a graphical model to provide executable instructions to execute on a computational hardware device having one or more processors, the automatic code generator providing a compiler directive to associate one of a code segment and a data segment of the executable instructions with a named memory section to be associated with a memory element of the computational hardware device, the code segment and the data segment representing at least a portion of functionality of the graphical model; and a memory mapping generator obtaining program information descriptive of one of the code and data segment, and memory information descriptive of the one or more memory elements of the computational hardware device to automatically generate a memory mapping that provides for executing the executable instructions in a desired manner on the computational hardware device, wherein the memory mapping generator automatically generates the memory mapping from a comparison between the program information and the memory information to determine a placement of one or more code and data segments of the executable instructions to portions of the one or more memory elements of the computational hardware device.

21. The system of claim 20, wherein one of the automatic code generator and the memory mapping generator execute on one of a client and a server.

22. The system of claim 20, wherein one of the program information, the memory information, the code, and the memory mapping may reside on one of a client and a server.

23. The system of claim 20, wherein the automatic code generator generates a linker file to incorporate the memory mapping provided by the memory mapping generator into a building of a program having the executable instructions.

24. The system of claim 20, wherein the automatic code generator in communication with the memory mapping generator automatically obtains the memory mapping from the memory mapping generator.

25. The system of claim 20, wherein the program information comprises a description of one or more of the following: a size of one of the code segment and the data segment, a frequency of access by the executable instructions to one of the code segment and the data segment, and a priority associated with one of the code segment and the data segment.

26. The system of claim 20, wherein the memory information comprises a description of one or more of the following: a size of a memory element, an access rate of the memory element, and a configuration of the memory element.

27. The system of claim 20, wherein the memory mapping generator automatically generates the memory mapping by:

determining from the program information a first program segment having a first priority, and determining from the memory information a first memory portion of the one or more memory elements having a first desired characteristic;

assigning the first program segment to the first memory portion;

determining from the program information a second program segment having a next priority, and determining from the memory information a second memory portion of the one or more memory elements having one of the first desired characteristic and a second desired characteristic;

assigning the second program segment to the second memory portion; and providing as the memory mapping a memory mapping identifying the assignment of the first program segment and the second program segment.

28. The system of claim 20, wherein the memory mapping generator automatically generates the memory mapping by:

obtaining a first memory mapping and a second memory mapping from a plurality of memory mappings for executing the executable instructions on the computational hardware;

determining from executing on a program simulator the executable instructions incorporating the first memory mapping to determine a first time profile;

determining from executing on a program simulator the executable instructions incorporating the second memory mapping to determine a second time profile and providing as the memory mapping one of the first memory mapping and the second memory mapping having a desired time profile.

29. A computer-readable medium storing computer-executable instructions, the instructions when executed in a processor of a computer causing the computer to perform a method of determining a memory mapping for executable instructions generated from a graphical model to execute on a computational hardware device having one or more processors, the method comprising:

receiving program information comprising a description of one or more program segments, each program segment comprising one of a code segment and a data segment of executable instructions generated from a graphical model;

receiving memory information comprising a description of one or more memory elements of the computational hardware device; and using the program information to the memory information to determine a memory mapping that provides for executing the executable instructions in a desired manner on the computational hardware device, the memory mapping identifying placement of the one or more program segments to portions of the one or more memory elements.

30. The computer-readable medium of claim 29, wherein a memory mapping generator automatically determines the memory mapping to provide the memory mapping to form an executable from the executable instructions incorporating the memory mapping.

31. The computer-readable medium of claim 29, wherein the program information comprises a description of one or more of the following: a size of one of the code segment and the data segment, a frequency of access by the executable instructions to one of the code segment and the data segment, and a priority associated with one of the code segment and the data segment.

32. The computer-readable medium of claim 29, wherein the memory information comprises a description of one or more of the following: a size of a memory element, an access rate of the memory element, and a configuration of the memory element.

33. The computer-readable medium of claim 29, wherein the determining comprises applying an optimization algorithm of one of a heuristic type, an exhaustive type, and a genetic type.

34. The computer-readable medium of claim 29, wherein the determining comprises:

determining from the program information a first program segment having a first priority, and determining from the memory information a first memory portion of the one or more memory elements having a first desired characteristic;

assigning the first program segment to the first memory portion;

determining from the program information a second program segment having a second priority, and determining from the memory information a second memory portion of the one or more memory elements having one of the first desired characteristic and a second desired characteristic; and assigning the second program segment to the second memory portion.

35. The computer-readable medium of claim 34, wherein the first priority of the first program segment and the second priority of the second program segment is determined from one of a size of the program segment and a frequency of access by the program to the program segment.

36. The computer-readable medium of claim 29, wherein the determining comprises:

obtaining a first memory mapping from a plurality of memory mappings for executing the executable instructions on the computational hardware device;

determining a first time profile from executing on a program simulator the program incorporating the first memory mapping; and determining from the first time profile if the first memory mapping provides a desired time profile.

37. The computer-readable medium of claim 36, wherein the method further comprises:

obtaining a second memory mapping from the plurality of memory mappings for executing the executable instructions on the computational hardware device;

determining a second time profile from executing on the program simulator the executable instructions incorporating the second memory mapping; and comparing the first time profile to the second time profile to determine the one of the first memory mapping and the second memory mapping having the desired time profile.

38. A computer-readable medium storing computer-executable instructions, the instructions when executed in a processor of a computer causing the computer to perform a method of generating code from a graphical model to incorporate a memory mapping for executable instructions to run on a computational hardware device, the method comprising:

initiating an automatic generation of code for a graphical model to provide executable instructions to run on a computational hardware device having one or more processors;

assigning one of a code segment and a data segment of the generated code to a named memory section to be associated with a memory element of the computational hardware device, the code and data segment representing at least a portion of functionality of the graphical model;

obtaining a memory mapping providing an optimization of execution of the executable instructions on the computational hardware device, the memory mapping describing a placement of one of the code segment and the data segment to a portion of a memory element of the computational hardware device; and providing a linker file to associate, in building an executable from the executable instructions, the named memory section with the portion of the memory element as determined by the memory mapping.

39. The computer-readable medium of claim 38, wherein the method further comprises:

building an executable from executable instructions with the linker file to incorporate the memory mapping.

40. The computer-readable medium of claim 38, wherein the automatic generation of code assigns one of the code segment and the data segment to the named memory section via one of a compiler directive and a linker directive.

41. A computer-readable medium storing computer-executable instructions, the instructions when executed in a processor of a computer causing the computer to perform a method of automatically generating code and determining a memory mapping for executing instructions on a computational hardware device having one or more processors, the method comprising:

initiating an automatic generation of code from a graphical model to provide executable instructions to execute on the computational hardware device, the automatic generation of code providing one or more compiler directives to place one of a code segment and a data segment of the executable instructions into a named memory section, the code segment and the data segment representing at least a portion of functionality of the graphical model;

obtaining program information comprising a description of one or more code and data segments of the executable instructions;

obtaining memory information comprising a description of one or more memory elements of the computational hardware device;

determining a memory mapping providing for executing the executable instructions in a desired manner on the computational hardware device, the memory mapping automatically generated from a comparison between the program information and the memory information to determine a placement of one or more code and data segments of the executable instructions to portions of the one or more memory elements of the computational hardware device; and providing a linker file to associate the named memory section with the portion of the memory element as determined by the memory mapping.

42. The computer-readable medium of claim 41, wherein the program information comprises a description of one or more of the following: a size of one of the code segment and the data segment, a frequency of access by the executable instructions to one of the code segment and the data segment, and a priority associated with one of the code segment and the data segment.

43. The computer-readable medium of claim 41, wherein the memory information comprises a description of one or more of the following: a size of a memory element, an access rate of the memory element, and a configuration of the memory element.

44. The computer-readable medium of claim 41, wherein automatically generating the memory mapping comprises:

determining from the program information a first program segment having a first priority, and determining from the memory information a first memory portion of the one or more memory elements having a first desired characteristic;

assigning the first program segment to the first memory portion;

determining from the program information a second program segment having a second priority, and determining from the memory information a second memory portion of the one or more memory elements having one of the first desired characteristic and a second desired characteristic;

assigning the second program segment to the second memory portion; and providing as the memory mapping a memory mapping identifying the assignment of the first program segment and the second program segment.

45. The computer-readable medium of claim 41, wherein the first priority of the first program segment and the second priority of the second program segment is determined from one of a size of the program segment and a frequency of access by the executable instructions to the program segment.

46. The computer-readable medium of claim 41, wherein automatically generating the memory mapping comprises:

obtaining a first memory mapping from a plurality of memory mappings for executing the executable instructions on the computational hardware device;

determining a first time profile from executing on a program simulator the executable instructions incorporating the first memory mapping; and determining from the first time profile if the first memory mapping provides a desired time profile.

47. The computer-readable medium of claim 46, wherein the method further comprises:

obtaining a second memory mapping from the plurality of memory mappings for executing the executable instructions on the computational hardware device;

determining a second time profile from executing on the program simulator the executable instructions incorporating the second memory mapping; and comparing the first time profile to the second time profile to determine the one of the first memory mapping and the second memory mapping having the desired time profile.

48. In an electronic device, a method for determining a memory mapping for executable instructions to execute on a computational hardware device, the method comprising:

receiving program information comprising a description of one or more program segments, each program segment comprising one of a code segment and a data segment of executable instructions;

receiving memory information comprising a description of one or more memory elements of a computational hardware device having one or more processors; and comparing, by a memory mapping generator, the program information to the memory information to automatically determine a memory mapping that provides for executing the executable instructions in a desired manner on the computational hardware device, the memory mapping identifying placement of the one or more program segments to portions of the one or more memory elements.

49. The method of claim 48, wherein automatically generating the memory mapping comprises:

determining from the program information a first program segment having a first priority, and determining from the memory information a first memory portion of the one or more memory elements having a first desired characteristic;

assigning the first program segment to the first memory portion;

determining from the program information a second program segment having a second priority, and determining from the memory information a second memory portion of the one or more memory elements having one of the first desired characteristic and a second desired characteristic;

assigning the second program segment to the second memory portion; and providing as the memory mapping a memory mapping identifying the assignment of the first program segment and the second program segment.

50. The method of claim 49, wherein the determining comprises:

determining from the program information a first program segment having a first priority, and determining from the memory information a first memory portion of the one or more memory elements having a first desired characteristic;

assigning the first program segment to the first memory portion;

determining from the program information a second program segment having a second priority, and determining from the memory information a second memory portion of the one or more memory elements having one of the first desired characteristic and a second desired characteristic; and assigning the second program segment to the second memory portion.

51. The method of claim 48, wherein the first priority of the first program segment and the second priority of the second program segment is determined from one of a size of the program segment and a frequency of access by the executable instructions to the program segment.

52. The method of claim 51, wherein the first priority of the first program segment and the second priority of the second program segment is determined from one of a size of the program segment and a frequency of access by the executable instructions to the program segment.

53. The method of claim 50, wherein automatically generating the memory mapping comprises:

obtaining a first memory mapping from a plurality of memory mappings for executing the executable instructions on the computational hardware device;

determining a first time profile from executing on a program simulator the executable instructions incorporating the first memory mapping; and determining if the first memory mapping provides a desired time profile.

54. The method of claim 50, further comprising:

obtaining a second memory mapping from the plurality of memory mappings for executing the executable instructions on the computational hardware device;

determining a second time profile from executing on the program simulator the executable instructions incorporating the second memory mapping; and comparing the first time profile to the second time profile to determine the one of the first memory mapping and the second memory mapping having the desired time profile.

55. In an electronic device, a method for providing a memory mapping for executable instructions to execute on a computational hardware device having one or more processors, the method comprising:

receiving program information identifying one or more program segments, each program segment comprising one of a code segment and a data segment of executable instructions;

receiving memory information identifying one or more memory elements of a computational hardware device, at least a portion of one of the memory elements is identified by a user; and generating a memory mapping identifying placement of the one or more program segments to portions of the one or more memory elements, the memory mapping providing for executing the executable instructions in a user desired manner on the computational hardware device.

56. The method of claim 55, further comprising:

the user identifying the portion of one of the memory elements by providing one of a name, a size, and a location of the portion.

57. The method of claim 55, wherein a portion of the program information is identified by a user.

* * * * *